US008245254B2

(12) United States Patent
Takagi

(10) Patent No.: US 8,245,254 B2
(45) Date of Patent: Aug. 14, 2012

(54) INFORMATION PROCESSING APPARATUS AND METHOD, AND RECORDING MEDIUM

(75) Inventor: Tsuyoshi Takagi, Kanagawa (JP)

(73) Assignee: Sony Corporation (JP)

( * ) Notice: Subject to any disclaimer, the term of this patent is extended or adjusted under 35 U.S.C. 154(b) by 412 days.

(21) Appl. No.: 12/460,324

(22) Filed: Jul. 16, 2009

(65) Prior Publication Data

US 2010/0031294 A1 Feb. 4, 2010

(30) Foreign Application Priority Data

Jul. 22, 2008 (JP) ................................ P2008-189104

(51) Int. Cl.
G06F 3/00 (2006.01)
G06F 13/00 (2006.01)
H04N 5/445 (2011.01)

(52) U.S. Cl. ......................................................... 725/45
(58) Field of Classification Search ...................... 725/45
See application file for complete search history.

(56) References Cited

U.S. PATENT DOCUMENTS

| 6,819,863 | B2 * | 11/2004 | Dagtas et al. ............... 386/249 |
| 7,617,511 | B2 * | 11/2009 | Marsh ............................. 725/45 |
| 8,056,100 | B2 * | 11/2011 | Herz et al. ...................... 725/46 |
| 2002/0157096 | A1 * | 10/2002 | Hane et al. .................... 725/46 |
| 2003/0221198 | A1 * | 11/2003 | Sloo ............................... 725/136 |
| 2006/0004704 | A1 * | 1/2006 | Gross .............................. 707/2 |
| 2006/0179419 | A1 * | 8/2006 | Narahara et al. ............. 717/109 |
| 2007/0288433 | A1 * | 12/2007 | Gupta et al. ................... 707/3 |
| 2008/0195595 | A1 * | 8/2008 | Masuyama et al. ............ 707/5 |

FOREIGN PATENT DOCUMENTS

JP 2006155336 A 6/2006
JP 2006-191486 A 7/2006

OTHER PUBLICATIONS

Office Action from Japanese Application No. 2008-189104, dated Apr. 15, 2010.

* cited by examiner

*Primary Examiner* — Brian Pendleton
*Assistant Examiner* — Jonathan V Lewis
(74) *Attorney, Agent, or Firm* — Lerner, David, Littenberg, Krumholz & Mentlik, LLP

(57) ABSTRACT

An information processing apparatus includes an obtaining unit configured to obtain program information on programs that are to be broadcast in a predetermined time period; an extraction unit configured to extract keywords indicating the content of the programs from text data contained in the program information; a storage unit configured to prestore theme definition information containing information on the keywords; a theme identifying unit configured to identify which theme a predetermined program belongs to on the basis of the keyword and the theme definition information; and a rate-of-change computation unit configured to compute, for each of the identified themes, a rate of change of the number of times a program belonging to the identified theme is broadcast on a first day in the predetermined time period to the number of times the program is broadcast on a second day.

9 Claims, 17 Drawing Sheets

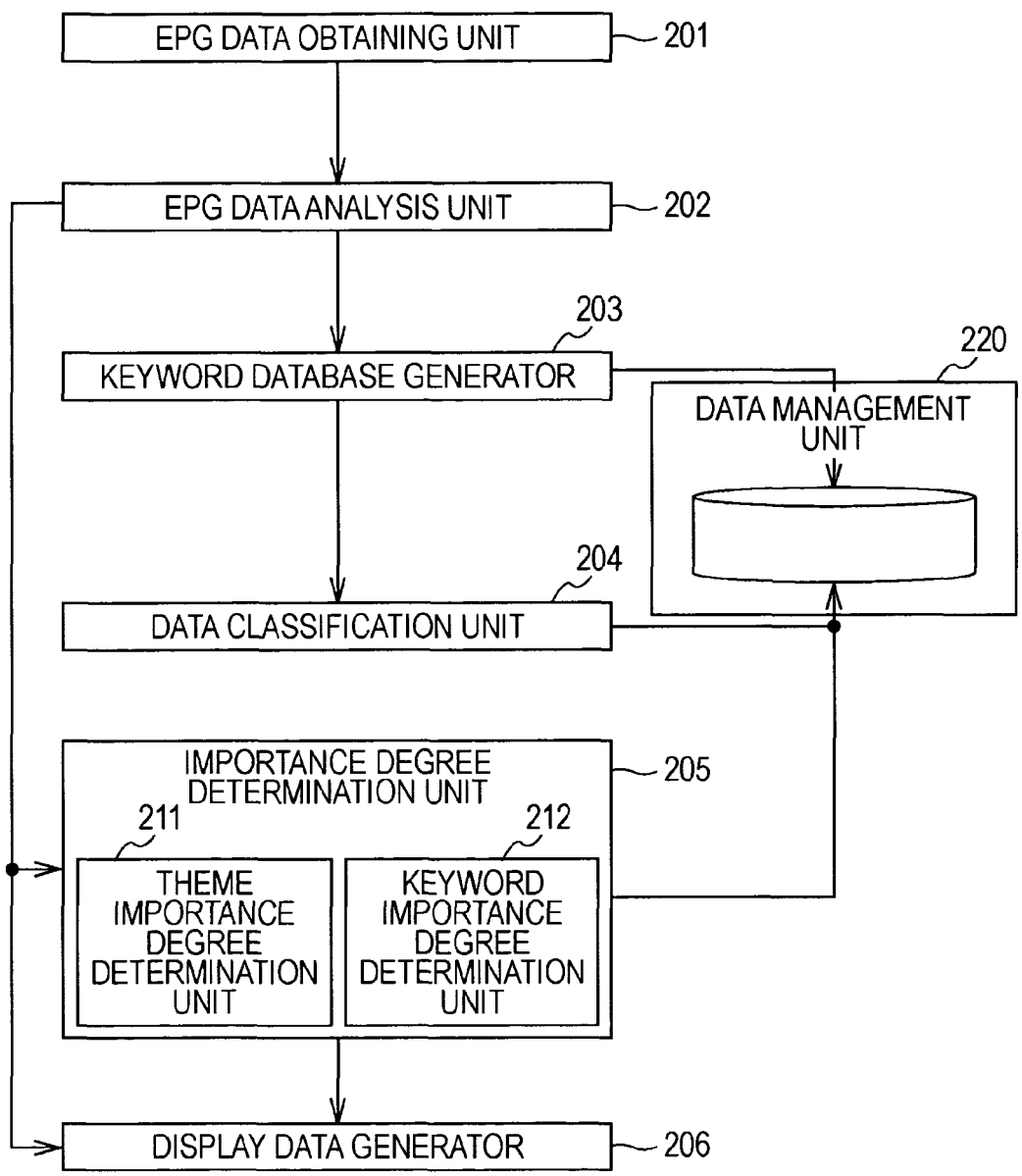

FIG. 4

| PROGRAM ID | 001A | 002B | ... |
|---|---|---|---|
| PROGRAM TITLE | GOING BY TRAIN | DREAM TOUR | ... |
| BROADCAST DATE | 9/28 | 9/28 | ... |
| BROADCAST STATION | STATION X | STATION Y | ... |
| GENRE | VARIETY | VARIETY | ... |
| PROGRAM LENGTH | 60 MINUTES | 45 MINUTES | ... |
| KEYWORDS | AUTUMN LEAVES, HOT SPRINGS, DAY TOUR,... | AUTUMN LEAVES, OT SPRINGS, TAKING A WALK,... | ... |

FIG. 5

| KEYWORDS | GASOLINE | SUB-METROPOLITAN | TENNIS WORLD CHAMPIONSHIP | ... |
|---|---|---|---|---|
| NUMBER OF APPEARANCES | 5 | 3 | 3 | ... |
| NUMBER OF APPEARANCE DAYS | 1 | 2 | 3 | ... |
| APPEARANCE DAYS | 9/28 | 9/28, 9/29 | 9/28, 9/29, 9/30 | ... |
| PLURAL BROADCAST STATIONS | ○ | ○ | × | ... |
| PROGRAM ID | 005E, ... | 006F, ... | 007G, ... | ... |

FIG. 6

- GOLDEN WEEK SPECIAL FEATURE
- CHRISTMAS SPECIAL FEATURE
- VALENTINE SPECIAL FEATURE
- VARIETY SPECIAL PROGRAM
- VARIETY SPECIAL PROGRAM FOR SPRING
- VARIETY SPECIAL PROGRAM FOR AUTUMN
- NEW DRAMA PROGRAM
- FINAL EPISODE OF DRAMA
- ⋮

FIG. 7

| THEME TITLE | FINAL EPISODE OF DRAMA | NEW DRAMA PROGRAM | ... |
|---|---|---|---|
| KEYWORDS | FINAL EPISODE, FINAL STORY | NEW WORK, NEW PROGRAM | ... |
| GENRE | DRAMA | DRAMA | ... |

FIG. 8

| THEME TITLE | FINAL EPISODE OF DRAMA | NEW DRAMA PROGRAM | VARIETY SPECIAL PROGRAM | ... |
|---|---|---|---|---|
| PROGRAM ID | 009A, 002B,··· | 003C,··· | 004D,··· | ... |
| NUMBER OF PROGRAMS ON DAY-BY-DAY BASIS | | | | ... |
| 9/28 | 1 | 1 | 1 | ... |
| 9/29 | 1 | 1 | 1 | ... |
| 9/30 | 2 | 1 | 0 | ... |
| 10/1 | 3 | 3 | 0 | ... |
| 10/2 | 1 | 1 | 1 | ... |
| 10/3 | 2 | 1 | 1 | ... |
| 10/4 | 3 | 1 | 1 | ... |
| 10/5 | 5 | 4 | 3 | ... |

FIG. 9

- ■ GOLDEN WEEK SPECIAL FEATURE
- ■ CHRISTMAS SPECIAL FEATURE
- ■ VALENTINE SPECIAL FEATURE
- ■ VARIETY SPECIAL PROGRAM
- ■ *VARIETY SPECIAL PROGRAM FOR SPRING*
- ■ *VARIETY SPECIAL PROGRAM FOR AUTUMN*
- ■ NEW DRAMA PROGRAM
- ■ FINAL EPISODE OF DRAMA
- ■ :
- ■ :

FIG. 17

```
GOLDEN WEEK (APRIL 25 TO MAY 5)
CHRISTMAS (DECEMBER 10 TO DECEMBER 25)
VALENTINE (FEBRUARY 1 TO FEBRUARY 14)
AUTUMN LEAVES (OCTOBER 16 TO NOVEMBER 16)
        ⋮
```

FIG. 20

- AUTUMN LEAVES SPECIAL FEATURE -

WEDNESDAY 10/21 | TO BE BROADCAST SOON
19:00 - 20:00
XX TV

TOUR IN WHICH WALKING AND AUTUMN LEAVES ARE ENJOYED BY TRAIN
TOUR OF AUTUMN LEAVES BY TRAIN WITH EXQUISITE VIEW IN THIS AUTUMN

THURSDAY 10/22
19:00 - 20:00
YY TV

DREAM TOUR  AUTUMN LEAVES DRIVING WITH EXQUISITE VIEW
OVERWHELMED! AUTUMN LEAVES OF EXQUISITE VIEW

FRIDAY 10/23
18:00 - 19:00
YY TV

EARTH ERA  CANADA
PHOTOGRAPH COLLECTION OF AUTUMN LEAVES OF CANADA

SATURDAY 10/24
17:00 - 18:00
ZZ TV

NIPPON!
WORLD HERITAGE OF GIFU-PREFECTURE/ AUTUMN LEAVES OF SIRAKAWAGO 371, 372, 373, 374, 375, 376, 377, 378

INFORMATION PROCESSING APPARATUS AND METHOD, AND RECORDING MEDIUM

CROSS-REFERENCE TO RELATED APPLICATION

The present application claims priority from Japanese Patent Application JP 2008-189104 filed in the Japanese Patent Office on Jul. 22, 2008, the entire content of which is incorporated herein by reference.

BACKGROUND OF THE INVENTION

1. Field of the Invention

The present invention relates to an information processing apparatus and method, and a recording medium and, more particularly, relates to an information processing apparatus and method, and a recording medium that are capable of presenting a wide range of programs that attract the interest of a user.

2. Description of the Related Art

Some digital recording devices, such as hard disk recorders, which have been sold in recent years, have been installed with a function of selecting predetermined programs from among recorded programs and of presenting the programs as recommended programs to a user.

In such devices, for example, programs are selected on the basis of program information on recorded programs, which is obtained from an EPG (Electronic Program Guide) and on the basis of settings made by a user so that programs of a genre selected by the user or programs containing keywords selected by the user in titles thereof become recommended programs.

However, in digital recording devices of the related art, although recommended programs can be selected and provided to the user, the display thereof is such that titles of programs are only listed and displayed together with the reason for recommendation. Therefore, the display is not interesting, and it is not possible for the user to easily confirm what kinds of programs have been given as recommended programs.

Accordingly, information on recommended programs is presented, rather than being given as a mere list of titles, in the same form as that in which, similar to the cover and the table of contents of a magazine, the outline of a plurality of special feature articles carried in the magazine is presented with photographs being mixed with the information as appropriate. Thus, it is possible for the user to easily confirm what kinds of programs have been given as recommended programs (see, for example, Japanese Unexamined Patent Application Publication No. 2006-191486).

SUMMARY OF THE INVENTION

However, in a case where recommended programs are to be presented like, for example, a plurality of special feature articles carried in a magazine, in the case that only programs in line with the preferences of a user are presented, this also may be insufficiently interesting. For example, in a magazine, special feature articles of a talked-about person and incidents are provided, and the outline of such special feature articles is printed on the cover of the magazine, causing the user to unconsciously take that magazine.

It is, in particular, desirable to be able to present a wide range of programs that attract the interest of a user.

According to an embodiment of the present invention, there is provided an information processing apparatus including: obtaining means for obtaining program information on programs that are to be broadcast in a predetermined time period; extraction means for extracting keywords indicating the content of the programs from text data contained in the program information obtained for each of the programs; storage means for prestoring theme definition information containing information on the keywords, each of the keywords being associated with a corresponding one of a plurality of themes; theme identifying means for identifying which theme a predetermined program belongs to on the basis of the keyword extracted for each program and on the basis of the theme definition information; and rate-of-change computation means for computing, for each of the identified themes, a rate of change of the number of times a program belonging to the identified theme is broadcast on a first day in the predetermined time period to the number of times the program is broadcast on a second day, wherein an importance degree indicating an importance characteristic of the theme for a user is determined on the basis of the computed rate of change.

The obtaining means may obtain information on programs that are to be broadcast in eight days from and including today. The rate-of-change computation means may compute a rate of change of the number of times of a program is broadcast today to the number of times the program is broadcast on the eighth day.

The information processing apparatus may further include presentation means for selecting a predetermined number of themes having a high importance degree from among the plurality of themes and for presenting information on the programs belonging to the selected themes as recommendation information to a user.

The recommendation information may be displayed as a screen that is formed into hierarchies on a display unit connected to the information processing apparatus.

When a day on which the recommendation information is presented to the user is within a preset time period during which the plurality of themes can be displayed in advance, the presentation means may present information on the programs belonging to the selected themes as recommendation information.

A time period during which themes containing words related to seasons from among the plurality of themes can be displayed may be set.

According to another embodiment of the present invention, there is provided an information processing method including the steps of: obtaining program information on programs that are to be broadcast in a predetermined time period; extracting keywords indicating the content of the programs from text data contained in the program information obtained for each of the programs; identifying which theme a predetermined program belongs to on the basis of the keyword extracted for each program and on the basis of prestored theme definition information containing information on keywords associated with a corresponding one of a plurality of themes; computing, for each of the themes, a rate of change of the number of times a program belonging to a corresponding one of the identified themes is broadcast on a first day in the predetermined time period to the number of times the program is broadcast on a second day, and identifying an importance degree indicating importance characteristics of the theme for a user is determined on the basis of the computed rate of change.

According to another embodiment of the present invention, there is provided a recording medium having recorded thereon a program for causing a computer to function as an information processing apparatus including: obtaining means for obtaining program information on programs that are to be broadcast in a predetermined time period; extraction means for extracting keywords indicating the content of the programs from text data contained in the program information obtained for each of the programs; storage means for prestoring theme definition information containing information on the keywords, each of the keywords being associated with a corresponding one of a plurality of themes; theme identifying means for identifying which theme a predetermined program belongs to on the basis of the keyword extracted for each program and on the basis of the theme definition information; and rate-of-change computation means for computing, for each of the identified themes, a rate of change of the number of times a program belonging to the identified theme is broadcast on a first day in the predetermined time period to the number of times the program is broadcast on a second day, wherein an importance degree indicating an importance characteristic of the theme for a user is determined on the basis of the computed rate of change.

In an embodiment of the present invention, program information on programs that are to be broadcast in a predetermined time period is obtained. Keywords indicating the content of the programs are extracted from text data contained in the program information obtained for each of the programs. Which theme a predetermined program belongs to is identified on the basis of the keywords extracted for each program and on the basis of prestored theme definition information containing information on keywords associated with a corresponding one of a plurality of themes. A rate of change of the number of times a program belonging to a corresponding one of the identified themes is broadcast on a first day in the predetermined time period to the number of times the program is broadcast on a second day is computed for each of the themes. An importance degree indicating an importance characteristic of the theme for a user is determined on the basis of the computed rate of change.

According to embodiments of the present invention, it is possible to present a wide range of programs that attract the interest of a user.

BRIEF DESCRIPTION OF THE DRAWINGS

FIG. 3 is a block diagram showing an example of the functional structure of software executed by a CPU of FIG. 2;

FIG. 4 shows an example of the structure of a keyword file;

FIG. 5 shows an example of the structure of a keyword database;

FIG. 6 shows an example of a list of themes;

FIG. 7 shows an example of theme definition information;

FIG. 8 shows an example of a theme data file;

FIG. 9 shows another example of a list of themes;

FIG. 17 shows examples of themes of seasons and displayable time periods;

FIG. 20 shows an example of a screen of a second hierarchy of the recommendation screen.

DESCRIPTION OF THE PREFERRED EMBODIMENTS

Embodiments of the present invention will be described below with reference to the drawings.

Figure 1:
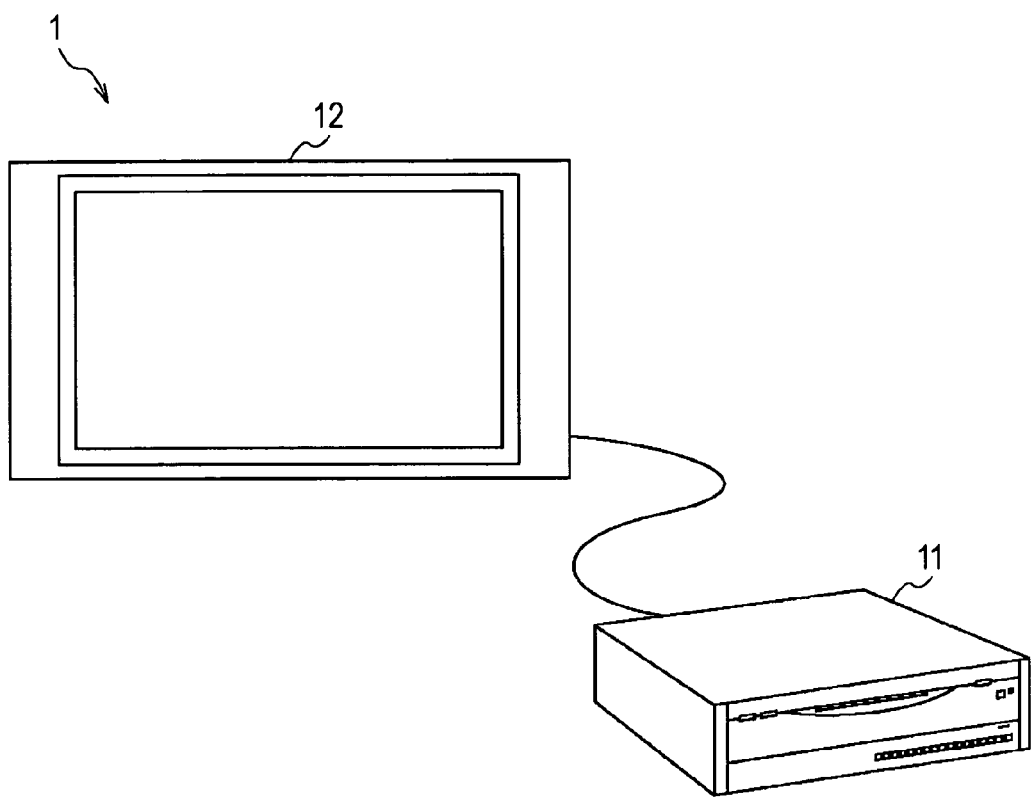
FIG. 1 shows an example of the configuration of a program presentation system according to an embodiment of the present invention.

FIG. 1 is a block diagram showing an example of the configuration of a program presentation system 1 according to an embodiment of the present invention. In FIG. 1, the program presentation system 1 includes a recording and reproduction device 11 and a television receiver 12 connected to the recording and reproduction device 11 via a cable.

The recording and reproduction device 11 is formed as, for example, a digital recording device having an HDD (Hard Disk Drive) incorporated therein, and is configured to obtain data of a program from a broadcast wave received by an antenna (not shown), and store and record the obtained data of the program in the HDD.

Furthermore, the recording and reproduction device 11 also has a function of obtaining a broadcast EPG or obtaining an EPG by downloading it from a predetermined server connected via the Internet. The EPG obtained by the recording and reproduction device 11 includes program information, such as the title of a program, a genre, broadcast date and time, performers, and the outline of the program, with regard to each program.

As a result of, for example, a predetermined program that is appropriate for the theme that is estimated to attract the interest of a user from among programs scheduled to be broadcast being selected, the recording and reproduction device 11 causes a recommended information screen on which information on programs belonging to the theme are presented to be displayed on the screen of the television receiver 12. Furthermore, as a result of, for example, keywords that are estimated to attract the interest of the user from among programs scheduled to be broadcast being selected, the recording and reproduction device 11 causes a recommended information screen on which information on programs containing the keywords are presented to be displayed on the screen of the television receiver 12.

Figure 2:
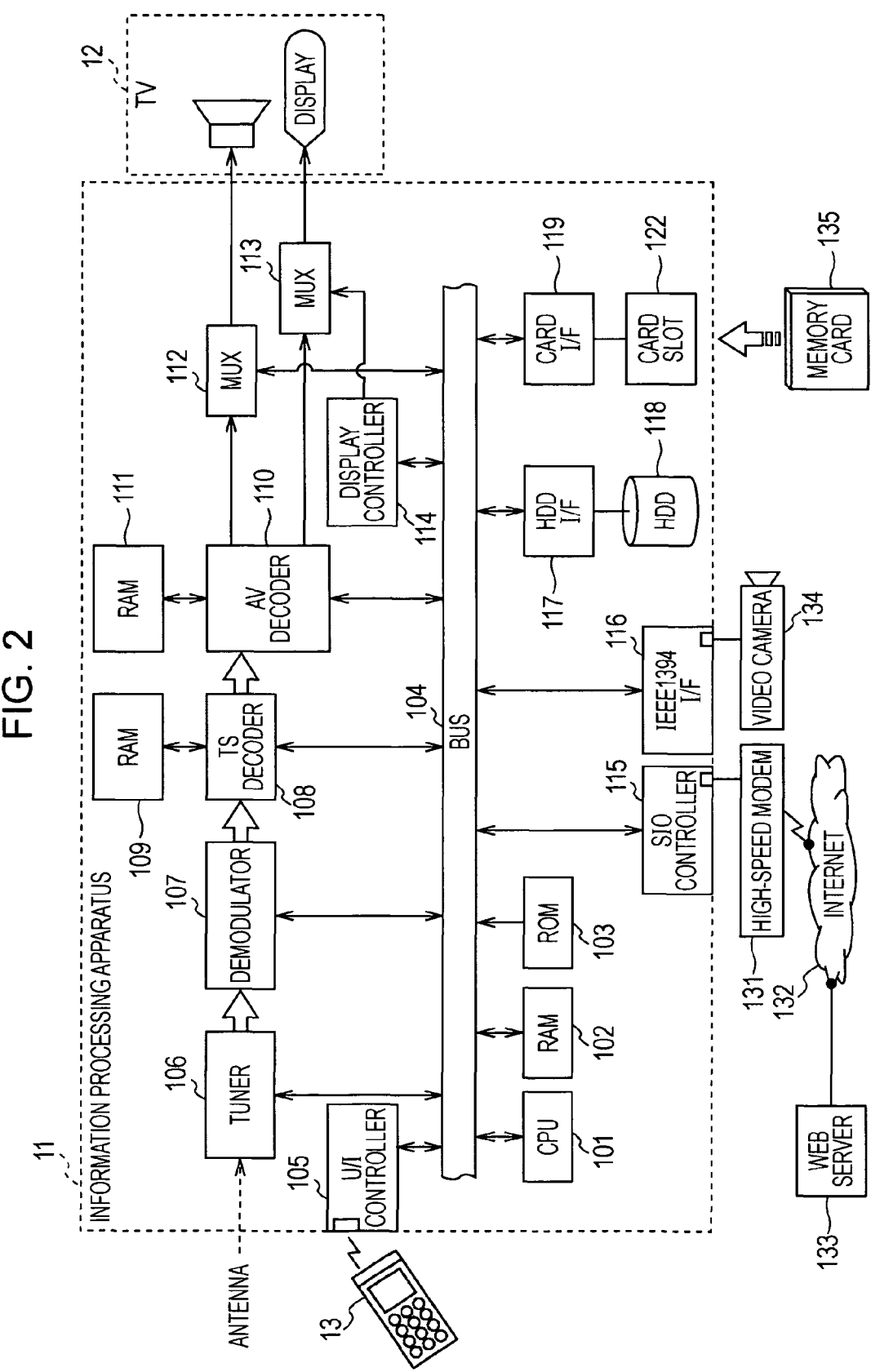
FIG. 2 is a block diagram showing an example of the configuration of a recording and reproduction device of FIG. 1.

FIG. 2 is a block diagram showing an example of the configuration of the recording and reproduction device 11.

In FIG. 2, a central processing unit (CPU) 101 executes a program stored in a read-only memory (ROM) 103 or a program loaded from the HDD 118 via an HDD I/F 117 and a bus 104 to a RAM (Random Access Memory) 102, and controls the operation of each unit in response to, for example, an instruction (a command from a remote controller 13) from the user, which is received by a user interface (U/I) controller 105.

Under the control of the CPU 101, a tuner 106 receives a broadcast signal from an antenna (not shown), and outputs the received signal to a demodulator 107.

The demodulator 107 demodulates the received signal supplied from the tuner 106, and outputs a transport stream broadcast through a predetermined channel to a TS decoder 108.

Under the control of the CPU 101, the TS decoder 108 extracts a predetermined stream from the transport stream supplied from the demodulator 107 by using the RAM 109, and outputs the packets forming the extracted stream onto the bus 104 or to an AV decoder 110. The packets (the data of a program) supplied onto the bus 104 are, for example, supplied to the HDD 118 via the HDD I/F 117, whereby they are recorded.

Furthermore, the data of the EPG obtained by the TS decoder 108 is also supplied to the HDD 118, whereby it is recorded as appropriate. The EPG is, for example, superposed on a broadcast wave and transmitted, and is updated in units of one day. Usually, the EPG is formed in such a manner that information on each of programs broadcast during eight days from and including today is described.

The AV decoder 110 decodes video data (video packets) and audio data (audio packets) supplied from the TS decoder 108 by using the RAM 111, outputs an audio signal obtained by decoding to an MUX 112, and outputs a video signal to an MUX 113.

The MUX 112 causes audio corresponding to the audio signal supplied from the AV decoder 110 to be output from a speaker of the television receiver 12.

The MUX 113 causes a predetermined image (screen) to be displayed on the display unit of the television receiver 12 on the basis of the video signal supplied from the AV decoder 110 and the video signal (OSD (On Screen Display) signal) supplied from a display controller 114.

Under the control of the CPU 101, the display controller 114 generates a video signal used to display a screen corresponding to the display data on the display unit, and outputs the generated video signal to the MUX 113.

An SIO (Serial I/O) controller 115 connects with a Web server 133 via the Internet 132 by controlling a high-speed modem 131, and downloads the EPG and the like as necessary. The EPG obtained as a result of the download is supplied to the HDD 118, whereby it is stored.

An IEEE (Institute of Electrical and Electronics Engineers) 1394 I/F 116 receives video data from a video camera 134 connected via an IEEE 1394 cable.

The HDD I/F 117 causes the data supplied via the bus 104 to be stored in the HDD 118, and supplies, in response to a request, the data stored in the HDD 118 to each unit via the bus 104.

A card I/F 119 causes the data supplied via the bus 104 to be recorded in a memory card 135 loaded into a card slot 122, and causes the data recorded in the memory card 135 to be read and output onto the bus 104.

FIG. 3 is a block diagram showing an example of the functional structure of software executed by the CPU 101.

The EPG data obtaining unit 201 obtains the EPG data, which is stored in the HDD 118. As described above, in the HDD 118, an EPG such that information on each of programs broadcast during eight days from and including this day (today) is described is stored as data. Therefore, in a case where today is Monday, it is possible for the EPG data obtaining unit 201 to obtain information regarding programs that are to be broadcast from today to Monday next week.

The EPG is, for example, data formed of a program guide of programs broadcast on each broadcast station on a predetermined day. Each program guide introduces corresponding programs, and is formed by, for example, the IDs of the programs, the program titles of the programs, information on program description such as a text describing the content of the programs, the genre of the programs, the broadcast start/end times, and other information.

An EPG data analysis unit 202 is configured to analyze the data of the EPG obtained by the EPG data obtaining unit 201 so as to be capable of extracting information, such as the IDs of the programs, the program titles, and on the program description, which are contained in the EPG, in units of programs. The EPG data analysis unit 202 is configured to convert the extracted information into, for example, text data and output it.

A keyword database creator 203 creates a keyword file in units of programs on the basis of the analysis result of the EPG data analysis unit 202. Here, the keyword file is made to be data that associates information that identifies a program with keywords contained in the program title of the program with information such as the program description. Furthermore, the keyword database creator 203 obtains information, such as the program title and the program description, as text data, and the keywords are extracted on the basis of the text data. The keyword database creator 203 performs, for example, morphological analysis on text data of information such as the program title and the program description, thereby extracting words. Then, the keyword database creator 203 selects, for example, words registered in a dictionary file or the like provided in advance from among the words extracted as a result of being subjected to morphological analysis, and sets them as the keywords of the program.

FIG. 4 shows an example of the structure of a keyword file. In the example of FIG. 4, as attributes of the keyword file, a "Program ID", a "Program Title", a "Broadcast Day", a "Broadcast Station", a "Genre", a "Program Length", and "Keywords" are contained.

The attribute "Program ID" denotes information, such as a number that identifies a program. The attribute "Program Title" denotes information in which the program title of the program is described. The attribute "Broadcast Day" denotes information that indicates the day on which the program is to be broadcast. The attribute "Broadcast Station" denotes information that indicates a broadcast station on which the program is broadcast. The attribute "Genre" denotes information that indicates the genre of the program. The attribute "Program Length" denotes information that indicates the broadcast time period (temporal length) of the program. All the information is contained in the EPG and can be identified using the EPG.

The attribute "Keywords", as described above, denotes information in which keywords extracted as the keywords of the program by the keyword database creator 203 are described.

In the example of FIG. 4, the program title of the program of a program ID "001A" broadcast on station X on September 28 (9/28) is "Going by Train", and the keywords contain "Autumn Leaves", "Hot Springs", "Day Tour" . . . . The genre of this program is "Variety", and the program length is 60 minutes. The program title of the program ID "002B" broadcast on station Y on September 28 (9/28) is "Dream Tour", and the keywords contain "Autumn Leaves", "Hot Springs", and "Taking a Walk" . . . . The genre of this program is "Variety", and the program length is 45 minutes.

The keyword file is generated in units of programs. For example, information described in the column of the program ID "001A" of FIG. 4 is the keyword file of the program of the program ID "001A". Information described in the column of the program ID "002B" is the keyword file of the program of the program ID "002B".

Furthermore, the keyword database creator 203 creates a keyword database on the basis of the keyword file created as described above. Here, the keyword database is a database structured in such a manner that information, such as the number of times each of individual keywords has been extracted (appeared) within the data of the keyword file of a plurality of programs, can be identified.

FIG. 5 shows an example of the structure of a keyword database. In the example of FIG. 5, the attributes of the keyword database include "Keywords", "Number of Appearances", "Number of Appearance Days", "Appearance Day", "Plural Broadcast Stations", and "Program ID".

The attribute "Keywords" corresponds to a corresponding one of keywords detected from the keyword file of a plurality of programs.

The attribute "Number of Appearances" denotes information that indicates the number of times the keyword has appeared. In a case where, for example, a keyword "AAA" is extracted from the programs of a program ID "1111" and a program ID "2222", the value of the number of appearances of the keyword "AAA" is set to 2. In a case where a keyword "BBB" is extracted from the programs of a program ID "1111", a program ID "2222", and a program ID "3333", the value of the number of appearances of the keyword "BBB" is set to 3. The keywords of the programs extracted from the program ID "1111", the program ID "2222", and the program ID "3333" are identified on the basis of the information on the attribute "Keywords" of the keyword file shown in FIG. 4.

The attribute "Number of Appearance Days" denotes information that indicates the value that the day described in the attribute "Appearance Day" has been counted.

The attribute "Appearance Day" denotes information that each of the broadcast days of the programs from which such keywords have been extracted is described. For example, in a case where the keyword "AAA" is extracted from the program of the program ID "1111" broadcast on September 28 and the program of the program ID "2222" broadcast on September 28, the appearance day of the keyword "AAA" is "9/28 (September 28)". Furthermore, in a case where the keyword "BBB" is extracted from the program of the program ID "1111" and the program of the program ID "2222" broadcast on September 28, and the program of the program ID "3333" broadcast on September 29, the appearance days of the keyword "BBB" are "9/28 (September 28) and 9/29 (September 29)".

The attribute "Plural Broadcast Stations" denotes information that indicates whether or not the keyword is a keyword extracted from each of the programs broadcast from a plurality of different broadcast stations. For example, in a case where the keyword "AAA" is extracted from the program of the program ID "1111" broadcast on station X and the program of the program ID "2222" broadcast similarly on station X, the information on the plural broadcast stations with the keyword "AAA" is "x" (which denotes being nonapplicable). That is, it is shown that the keyword "AAA" is not a keyword extracted from each of the programs broadcast from a plurality of different broadcast stations. On the other hand, in a case where the keyword "BBB" is extracted from each of the program broadcast on station X and the program broadcast on station Y, the information on the plural broadcast stations of the keyword "BBB" is "○" (which denotes being applicable). That is, it is shown that the keyword "BBB" is a keyword extracted from each of the programs broadcast on a plurality of different broadcast stations.

In the example of FIG. 5, the value of the number of appearances of the keyword "Gasoline" is set to "5", the value of the number of appearance days is set to "1", and the appearance day is set to "9/28". Then, since the keyword "Gasoline" is a keyword extracted from each of the programs broadcast by a plurality of different broadcast stations, the field of the plural broadcast stations is set at "○". Furthermore, the value of the number of appearances of the keyword "Sub-Metropolitan" is set to "3", the value of the number of appearance days is set to "2", and the appearance days are set at "9/28" and "9/29". Then, since the keyword "Sub-Metropolitan" is a keyword extracted from each of the programs broadcast by a plurality of different broadcast stations, the field of the plural broadcast stations is set as "○". Furthermore, the value of the number of appearances of the keyword "Tennis World Championship" is set to "3", the value of the number of appearance days is set to "3", and the appearance days are set to "9/28", "9/29", and "9/30". Then, since the keyword "Tennis World Championship" is not a keyword extracted from each of the programs broadcast on a plurality of different broadcast stations, the field of the plural broadcast stations is set as "x".

The attribute "Program ID" represents the program ID of the program from which the keyword has been extracted. Each program ID is assumed to be described in such a manner as to be associated with the broadcast day of the program.

Referring back to FIG. 3, the keyword file and the keyword database created by the keyword database creator 203 are stored in a predetermined storage area by the data management unit 220. The data management unit 220 is configured to, for example, store the keyword file and the keyword database in a preset area inside the HDD 118.

By using the keyword file stored in the data management unit 220, the theme classification unit 204 makes a determination as to which theme each of the individual programs is classified into, and creates a theme data file.

Here, the theme data file is data such that data indicating programs belonging to a corresponding one a plurality of themes and the number of programs for each broadcast day is described. Furthermore, it is assumed that a plurality of predetermined themes exist and that theme definition information corresponding to each of those themes is, for example, stored by the data management unit 220.

FIG. 6 shows an example of a list of themes. "Golden Week Special Feature", "Christmas Special Feature", "Valentine Special Feature", . . . , "New Drama Program", and "Final Drama Episode" . . . , shown in FIG. 6, are made to be themes. The theme classification unit 204 identifies which theme each of the individual programs belongs to. For example, the program belonging to the theme "Golden Week Special Feature" is made to be a program of the content that is naturally recalled from the title of the theme (in this case, Golden Week Special Feature), and is made to be, for example, a program that introduces travel planning of consecutive holidays of May.

FIG. 7 shows an example of theme definition information. In this example, definition information on themes whose titles (theme names) are "Final Drama Episode", "New Drama Program" . . . is described.

The information described in the field of the theme name "Final Drama Episode" in FIG. 7 is a condition for the program to be classified to this theme. As the keywords of the program, "Final Episode", "Final Story", . . . are included, and the program whose genre is "Drama" is classified as a program belonging to the theme "Final Drama Episode". Furthermore, the information described in the field of the theme name "New Drama Program" in FIG. 7 is a condition for the program to be classified to this theme, and the program whose genre is "Drama" is classified as a program belonging to the theme "New Drama Program".

The theme classification unit 204 obtains the data of the above-described keyword file from the data management unit 220, checks the keyword with regard to each of the individual programs, and compares the keyword with the keyword of the theme definition information. Furthermore, the theme classification unit 204 checks a genre with regard to each of the individual programs, and compares the genre with the genre of the theme definition information.

As described above, the theme classification unit 204 identifies the theme to which each program belongs, and creates a theme data file. FIG. 8 shows an example of the structure of a theme data file. In the example of FIG. 8, the theme data file is formed of information on the theme names, the program IDs of the programs belonging to the themes, and the number of programs on a day-by-day basis.

For example, the programs belonging to the theme name "Final Episode of Drama" are assumed to be programs of the program IDs "009A", "002B", .... Furthermore, the programs of the program IDs "009A", "002B", and ... are assumed to be broadcast once on September 28 (9/28), broadcast once on September 29 (9/29), broadcast two times on September 30 (9/30), ..., and broadcast five times on October 5 (10/5). For example, the program of the program ID "009A" is to be broadcast on September 28, the program of the program ID "002B" is to be broadcast on September 29, ....

Similarly, the information on the programs belonging to the theme name "New Drama Program", the theme name "Variety Special Program" ... is also described.

The theme data file is created in units of themes. For example, the information described in the field of the theme name "Final Episode of Drama" of FIG. 8 is a theme data file of the theme of the theme name "Final Episode of Drama", and the information described in the field of the theme name "New Drama Program" is a theme data file of the theme of the theme name "New Drama Program".

As described above, in the theme data file, as to when and how many times the program belonging to the theme will be broadcast for the eight days from and including today is described. In this case, assuming that today is September 28, the number of times the program will be broadcast until October 5 is described.

Here, a description has been given by using FIG. 6 as an example of a list of themes. Alternatively, for example, themes may be set as shown in FIG. 9. In the example of FIG. 9, a lesser number of themes is used. The themes indicated in italic in FIG. 9 are themes used to further classify the programs belonging to the theme other than that as necessary.

Referring back to FIG. 3, by using the keyword database or the theme data file stored in the data management unit 220, the importance degree determination unit 205 determines the importance degree of each of the individual keywords or the importance degree of each of the individual themes. Here, the importance degree is made to be a value indicating the degree of probability of attracting the interest of a user, and is used in the processing of the display data generator 206 (to be described later).

The theme importance degree determination unit 211 of the importance degree determination unit 205 determines the importance degree of each of the individual themes by using the theme data file stored by the data management unit 220.

As described above with reference to FIG. 8, in the theme data file, the number of programs that will be broadcast for the eight days from and including today is described with respect to programs belonging to individual themes. In a case where the number of programs belonging to a certain theme is large, it is considered that the importance degree of the theme is high. However, it is not necessarily the case that, unconditionally, such a theme will attract the interest of the user. For example, it is considered that, among programs that are broadcast on the weekend (Friday, Saturday, or Sunday), the number of programs belonging to the theme "Variety Special Program" is large. The reason for this is that, usually, comedy programs, and the like are often broadcast on the weekend. As described above, there is a case in which the theme is closely associated with broadcast days (days of the week, or the like).

Therefore, in the embodiment of the present invention, the importance degree is determined by paying attention to a rate of change in the number of programs. For example, if today is assumed to be Monday, the number of programs that are broadcast today and that belong to the theme "TTT" is compared with the number of programs that are broadcast on Monday next week and that belong to the theme "TTT", thereby determining the rate of change thereof. If the number of programs that are broadcast today and that belong to the theme "TTT" is denoted as P and if the number of programs that are broadcast on Monday next week and that belong to the theme "TTT" is denoted as Q, the rate of change R of the number of programs belonging to the theme "TTT" is computed on the basis of the following expression:

$$R=(|P-Q|)/P$$

In the manner described above, the theme importance degree determination unit 211 obtains the rate of change of the number of programs with regard to each of the individual themes, and determines the importance degree by normalizing the rate of change. As a result of the above, for example, it is possible to set the importance degree of the theme which is much talked about to be high. There is a case in which the number of programs greatly differ depending on individual themes. Therefore, for example, the lower limit value of the number of programs may be determined, so that the importance degrees of the theme having the number of programs, which falls below the lower limit value, may be uniformly set to "0".

The keyword importance degree determination unit 212 of the importance degree determination unit 205 determines the importance degree of each of the individual keywords by using the keyword file and the keyword database stored in the data management unit 220.

As described above, the importance degree of individual themes is determined by the theme importance degree determination unit 211. As a consequence, it is considered that a theme with a high importance degree is recommended and programs belonging to the theme are presented, thereby sufficiently attracting the interest of the user. The theme widely associates programs of similar content with one another. For this reason, when programs are presented on the basis of only a theme, there is a case in which it is difficult to catch up with an unexpected topic. For example, in a case where a socially serious incident occurs, it is difficult for presentation of only programs belonging to a theme with a high importance degree to attract the interest of a user.

Therefore, in the embodiment of the present invention, the importance degree is determined with regard to a keyword that meets a predetermined condition, so that programs containing the keyword can be presented.

For example, in order to identify keywords of an unexpected topic, the keyword importance degree determination unit 212 searches the keyword file described above with reference to FIG. 4 for keywords of a program whose genre is "News". Then, the keyword importance degree determination unit 212 extracts only the keywords of a noun from among the searched-for keywords, and sets the keywords as candidate keywords.

Furthermore, the keyword importance degree determination unit 212 searches the keyword database described with reference to FIG. 5 for each of the candidate keywords. Then, it is determined whether or not the candidate keyword is a keyword extracted from each of the programs broadcast on a plurality of different broadcast stations. At this time, for example, it is determined whether the information on the plural broadcast stations of FIG. 5 is "◯" or "x". In a case where the candidate keyword is a keyword extracted from each of the programs broadcast on a plurality of different broadcast stations (the information on the plural broadcast stations of FIG. 5 is "◯"), it is further determined whether or not the candidate keyword is a keyword extracted from only the program that is to be broadcast today. At this time, for example, the determination is made on the basis of the information on the appearance day of FIG. 5.

Then, the number of appearances of the keyword determined to be the keyword extracted from only the program that is to be broadcast today is determined as the importance degree of the keyword.

As a result of the above, it is possible to set the importance degree of a keyword of an unexpected topic to be high. That is, since an unexpected topic has a high probability of being broadcast in a program whose genre is "News", candidate keywords are identified from programs of that genre. Furthermore, since an unexpected topic that attracts a lot of attention is naturally broadcast on each broadcast station, it is determined whether or not the keyword is a keyword extracted from each of a plurality of different broadcast stations. Furthermore, since it is difficult to schedule an unexpected topic in advance as broadcast content of a program, it is further determined whether or not the keyword is a keyword extracted from only the program that is to be broadcast today. The keyword of an unexpected topic whose importance degree has been determined in the manner described above will be referred to as a current-affairs keyword.

If a program including a current-affairs keyword is presented, it is also considered that the interest of a user can be attracted. However, for example, a topic selected from a perspective different from those of current-affairs keywords is also carried on the cover of a magazine sold in general. For example, a large-scale sports event corresponds to such a topic. A large-scale sports event does not suddenly occur, but the degree of attracting attention is considered to be very high during a time period in which the event is held. Such an event program should not be uniformly selected as, for example, the theme "sports" together with other sports programs, but should be presented as a program containing the keyword.

However, for example, a large-scale sports event is not necessarily broadcast on a plurality of different broadcast stations. Furthermore, an unexpected topic is not necessarily reported at a news program. That is, it is difficult for the keyword of an event that attracts a lot of attention to become a keyword extracted from each of a plurality of different broadcast stations. Therefore, it should be understood that the probability that a keyword of an event is contained in a current-affairs keyword is small.

Accordingly, in the embodiment of the present invention, an importance degree is also attached to a keyword different from a current-affairs keyword. Such a keyword will be referred to as an event keyword. It is assumed that event keywords are set in advance using EPG data or the like and are stored by the data management unit 220. That is, an event keyword is not selected from a keyword file as for a current-affairs keyword, and is set in advance as a keyword of a large-scale event, such as, for example, "Tennis World Championship" or "World Cup".

For example, a keyword of "Tennis World Championship", "World Cup", or the like is attached with an attribute of "sports". As described above, for example, keywords having attributes in the EPG data are set as event keywords.

The keyword importance degree determination unit 212 searches the keyword database described above with reference to FIG. 5. for each of the event keywords. Then, the keyword importance degree determination unit 212 determines whether or not the event keyword is contained in the program that is to be broadcast tomorrow. At this time, for example, the determination is made on the basis of the information on the appearance day of FIG. 5.

When it is determined that the event keyword is contained in the program that is to be broadcast tomorrow, the keyword importance degree determination unit 212 identifies the program ID corresponding to the event keyword, and checks the keyword file corresponding to the identified program ID. Then, the keyword importance degree determination unit 212 determines whether or not a predetermined keyword is contained in the keyword file corresponding to the identified program ID. More specifically, for example, it is determined whether or not a keyword, such as "Relay" or "Live Relay", is contained in the keywords described in the attribute "keyword" corresponding to the program ID of the keyword file described above with reference to FIG. 4.

When it is determined that the above-described predetermined keyword is contained, the keyword importance degree determination unit 212 further determines whether or not a preset NG word is contained. Here, the NG word is a keyword by which the program can be identified to be not a live broadcast in the program corresponding to the predetermined event keyword. More specifically, it is determined whether or not an NG word, such as "Summarized Version" or "Digest" is contained in the keywords described in the attribute "Keywords" corresponding to the program ID of the keyword file described above with reference to FIG. 4.

When it is determined that the NG word is not contained, the keyword importance degree determination unit 212 determines the number of appearances of the event keyword as the importance degree of the event keyword. At this time, for example, the value of the number of appearances of the keyword database described above with reference to FIG. 5 is used.

As a result of the above, it is possible to set the importance degree of the event keyword of an event that attracts a lot of attention. Furthermore, it is determined whether or not the event keyword is contained in the program that is to be broadcast tomorrow, and it is further determined whether or not a keyword, such as "Relay" or "Live Relay", is contained and whether or not an NG word, such as "Summarized Version" or "Digest", is contained. As a consequence, it is possible to set the importance degree of the event keyword to be high at a timing the keyword should be presented to the user.

Referring back to FIG. 3, on the basis of the theme whose importance degree has been determined by the importance degree determination unit 205, the keyword, and the EPG data which has undergone the processing by the EPG data analysis unit 202, the display data generator 206 generates display data for a recommended information screen on which information on the programs belonging to the theme is presented or for a recommended information screen on which information on the programs belonging to the keyword is presented.

The detailed processing of the display data generator 206 will be described later.

The above-described keyword file, the keyword database, and the theme data file are intermediate data that identifies the importance degree of a keyword or a theme. For example, in a case where similar data has already been generated to implement a recommendation function of the recording and reproduction device 11, data that has already been generated may be used without generating a keyword file, a keyword database, and a theme data file again.

Furthermore, the keyword file, the keyword database, and the theme data file do not necessarily mean a file or a database that is created as a file that can be recognized by a FAT (File Allocation Table) system or as a database that can be searched for by SQL (Structured Query Language). For example, by directly editing EPG data, the data stored in the RAM 102 can also be used as a keyword file, a keyword database, and a theme data file.

Each unit of FIG. 3 has been described as a function block of software executed by the CPU 101. Alternatively, for example, an LSI (Large Scale Integration) chip or the like, which implements functions similar to those of each unit of FIG. 3 described above, may be formed, and the LSI chip may be provided in the recording and reproduction device 11.

Next, a description will be given, with reference to the flowchart of FIG. 10, of an example of a keyword database creation process for creating the above-described keyword database. With this process, not only a keyword database but also a keyword file is created. This process is performed, for example, each time new EPG data is obtained.

In step S101, the EPG data analysis unit 202 analyzes EPG data obtained by the EPG data obtaining unit 201, and extracts, in program units, information, such as the IDs of the programs contained in the EPG, the program titles, and the descriptions of the programs.

In step S102, the keyword database creator 203 obtains the information on the program supplied after undergoing the process of step S101.

In step S103, the keyword database creator 203 extracts words by performing morphological analysis on text data of the information, such as the program title and the program description, contained in the information on the program obtained in the process of step S102.

In step S104, the keyword database creator 203 extracts keywords of the program by selecting words registered in a dictionary file provided in advance from among the words extracted after being subjected to morphological analysis in the process of step S103.

In step S105, the keyword database creator 203 creates a keyword file. As a result, for example, such a keyword file as that described above with reference to FIG. 4 is created. At this point in time, a keyword file corresponding to one program is created. For example, only the column of the program of the program ID "001A" of FIG. 4 is created. The generated keyword file will be stored in the data management unit 220.

In step S106, the keyword database creator 203 determines whether or not a next program exists. In a case where a keyword file has not yet been created with regard to all the programs contained in the EPG, it is determined in step S106 that the next program exists. The process then returns to step S102.

Then, the processing of steps S102 to S105 is performed. For example, a keyword file corresponding to the program of the program ID "002B" of FIG. 4 is created.

As described above, the processing of steps S102 to S106 is repeatedly performed until a keyword file is created with regard to all the programs contained in the EPG.

When it is determined in step S106 that the next program does not exist, the process proceeds to step S107.

In step S107, the keyword database creator 203 creates a keyword database by using the keyword file created in the process of step S105. As a result, for example, such a keyword database as that described above with reference to FIG. 5 is stored in the data management unit 220.

In the manner described above, the keyword database and the keyword file are created.

Figure 11:
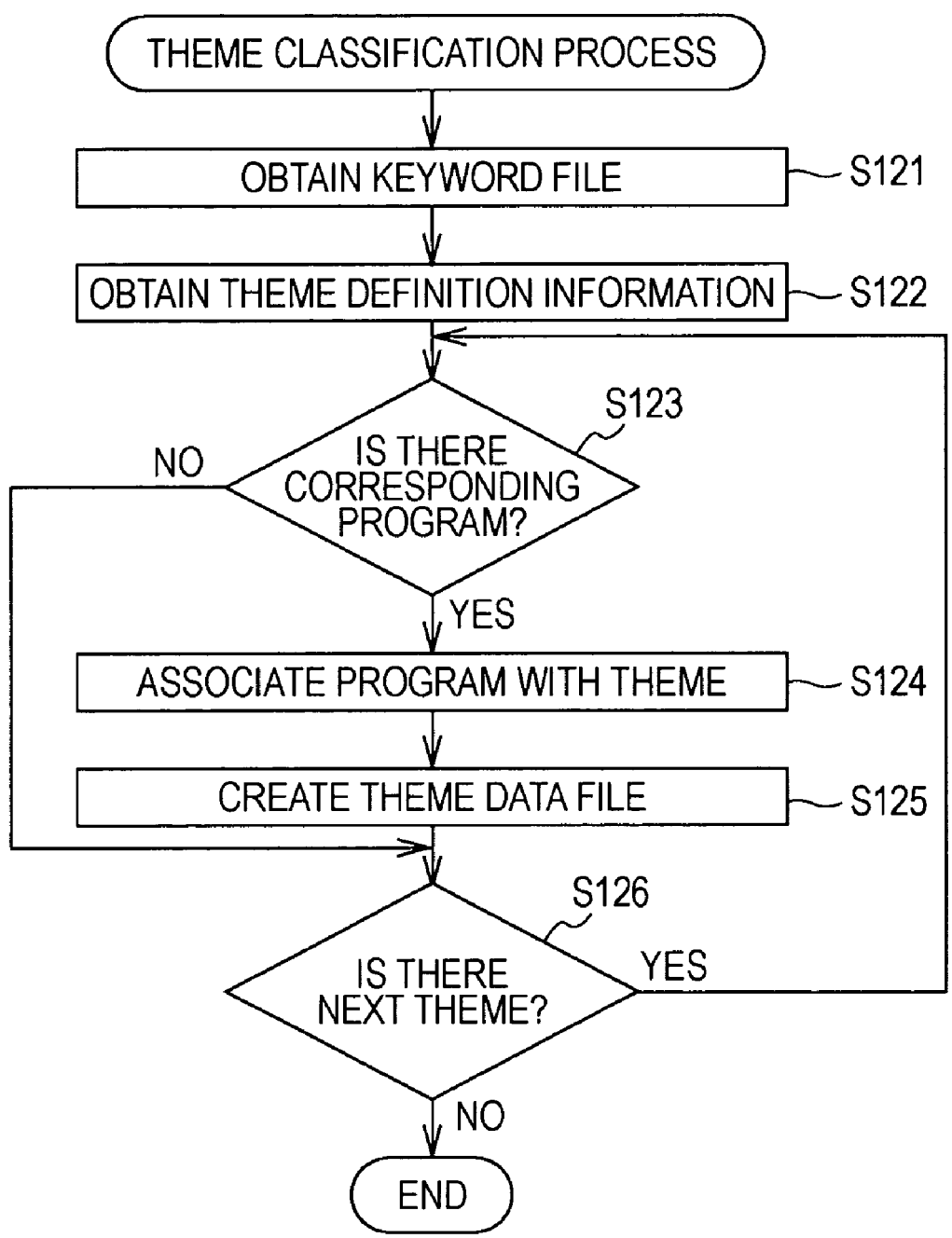
FIG. 11 is a flowchart illustrating an example of a theme classification process.

Next, a description will be given, with reference to the flowchart of FIG. 11, of an example of a theme classification process for classifying programs into themes.

Figure 10:
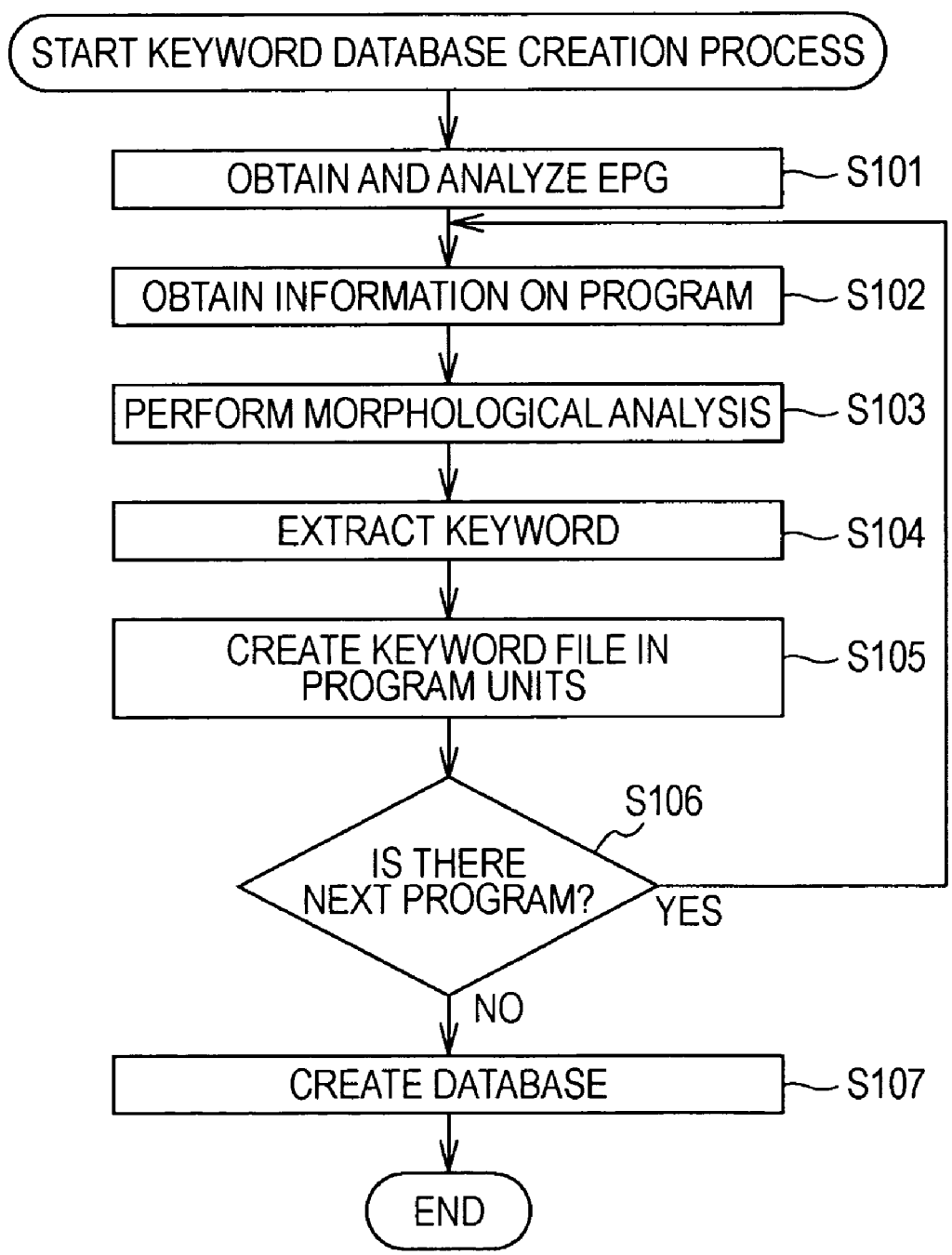
FIG. 10 is a flowchart illustrating an example of a keyword database creation process.

This process is automatically performed in response to the completion of the keyword database creation process of FIG. 10.

In step S121, the theme classification unit 204 obtains a keyword file stored in the data management unit 220.

In step S122, the theme classification unit 204 obtains theme definition information stored in the data management unit 220.

In step S123, the theme classification unit 204 selects the definition information of one theme within the theme definition information obtained in the process of step S122, and determines whether or not there is a program belonging to the theme from among the programs of the keyword file obtained in step S121.

When it is determined in step S123 that there is a program belonging to the theme, the process proceeds to step S124. In step S124, the theme classification unit 204 associates the program with the theme. That is, the program is associated as a program belonging to the theme.

In step S125, the theme classification unit 204 creates a theme data file. As a result, for example, a theme data file such as that shown in FIG. 8 is created. At this point in time, a theme data file of one theme is created. For example, only the column of the theme of the theme name "Final Drama Episode" of FIG. 8 is created. The created theme data file will be stored in the data management unit 220.

In step S126, the theme classification unit 204 determines whether or not a next theme exists. For example, in a case where the classification of the programs has not yet been completed with regard to all the themes shown in FIG. 6, it is determined in step S126 that the next theme exists, and the process then returns to step S123.

Then, the theme classification unit 204 selects the definition information of the next one theme within the theme definition information, and determines whether or not there is a program belonging to the theme from among the programs of the keyword file. Then, the processing of steps S123 to S125 is performed. As a result, the theme data file of the next one theme is created. For example, the column of the theme of the theme name "New Drama Program" of FIG. 8 is created.

When it is determined in step S123 that there is no program belonging to the theme among the programs of the keyword file, the processes of steps S124 and S125 are skipped.

As described above, for example, the processing of steps S123 to S126 is repeatedly performed until the classification of the programs is completed with regard to all the themes shown in FIG. 6.

When it is determined in step S126 that the next theme does not exist, the processing is completed.

In the manner described above, the theme classification process is performed, thereby creating a theme data file.

Figure 12:
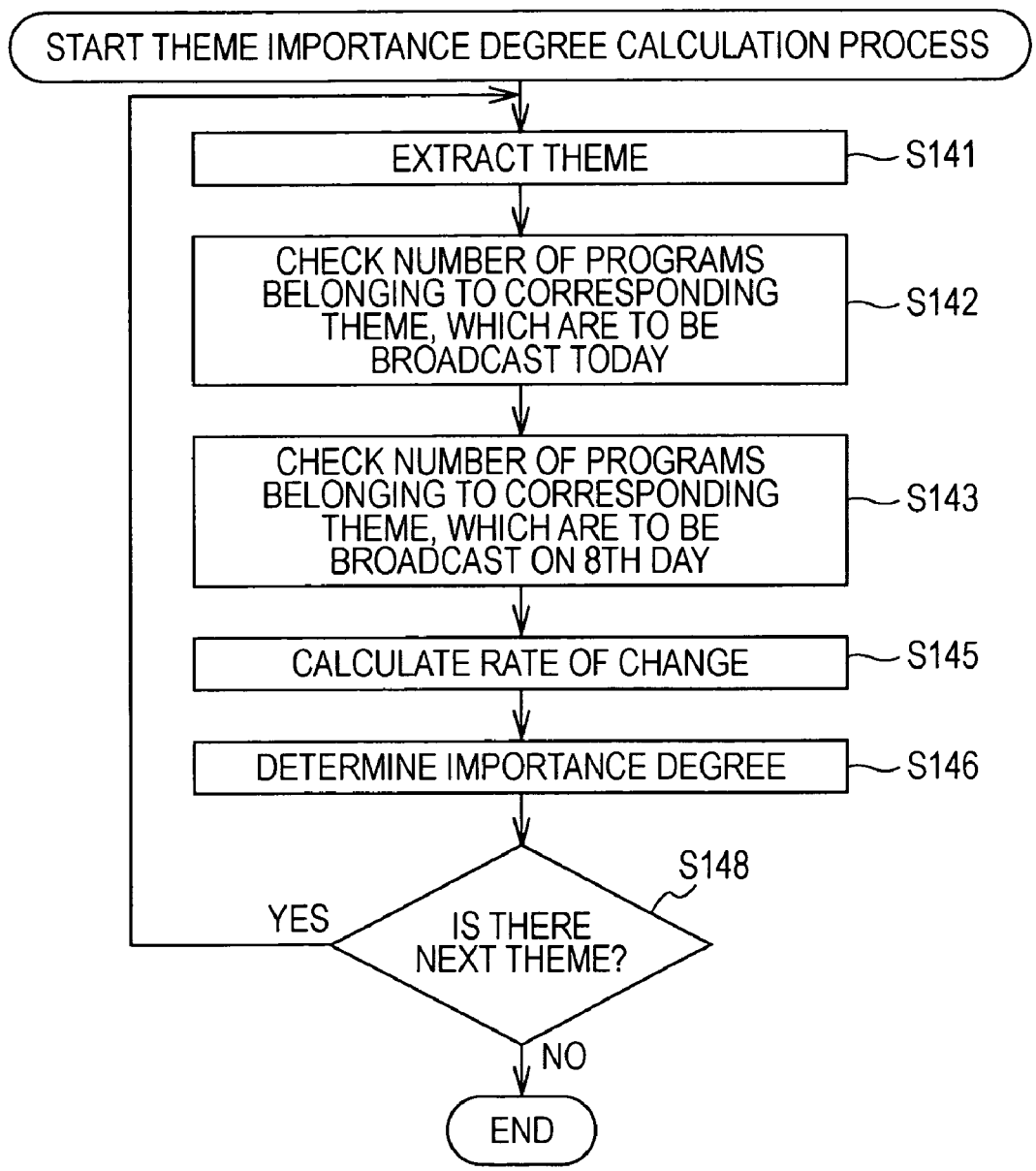
FIG. 12 is a flowchart illustrating an example of a theme importance degree calculation process.

Next, a description will be given, with reference to the flowchart of FIG. 12, of an example of a theme importance degree calculation process. This process is automatically performed, for example, in response to the completion of the theme classification process of FIG. 11.

In step S141, the keyword importance degree determination unit 212 of the importance degree determination unit 205 extracts one theme from among the themes of the theme data file stored in the data management unit 220.

In step S142, the theme importance degree determination unit 211 checks the number of programs that belong to the theme extracted in step S141 and that are to be broadcast today.

In step S143, the theme importance degree determination unit 211 checks the number of programs that belong to the theme extracted in step S141 and that are to be broadcast on the 8th day.

As described above with reference to FIG. 8, in the theme data file, the number of programs that are to be broadcast during the eight days from and including today with regard to the programs belonging to individual themes is described. The processes of steps S142 and S143 are performed on the basis of the value of the number of programs described in the theme data file.

In step S145, the theme importance degree determination unit 211 computes the rate of change of the number of programs belonging to the theme. For example, when the number of programs (the number of programs that are to be broadcast today and that belong to the theme), which is obtained by the process of step S142, is denoted as P and when the number of programs (the number of programs that are to be broadcast one week later and that belong to the theme), which is obtained in the process of step S143, is denoted as Q, the rate of change R of the number of programs belonging to the theme is computed on the basis of the following expression:

$$R=(|P-Q|)/P$$

In step S146, the theme importance degree determination unit 211 determines the importance degree of the theme by normalizing the rate of change of the number of programs computed in the process of step S145.

In step S148, the theme importance degree determination unit 211 determines whether or not the next theme exists. For example, in a case where there is a theme whose importance degree has not yet been determined among the themes of the theme data file, it is determined in step S148 that there is a next theme. The process then returns to step S141.

Then, the processing of steps S141 to S148 is repeatedly performed.

When it is determined in step S148 that the next theme does not exist, the processing is completed.

In the manner described above, the importance degree of the theme is determined. As a result of the above, for example, it is possible to set the importance degree of the theme, which is much talked about, to be high.

Figure 13:
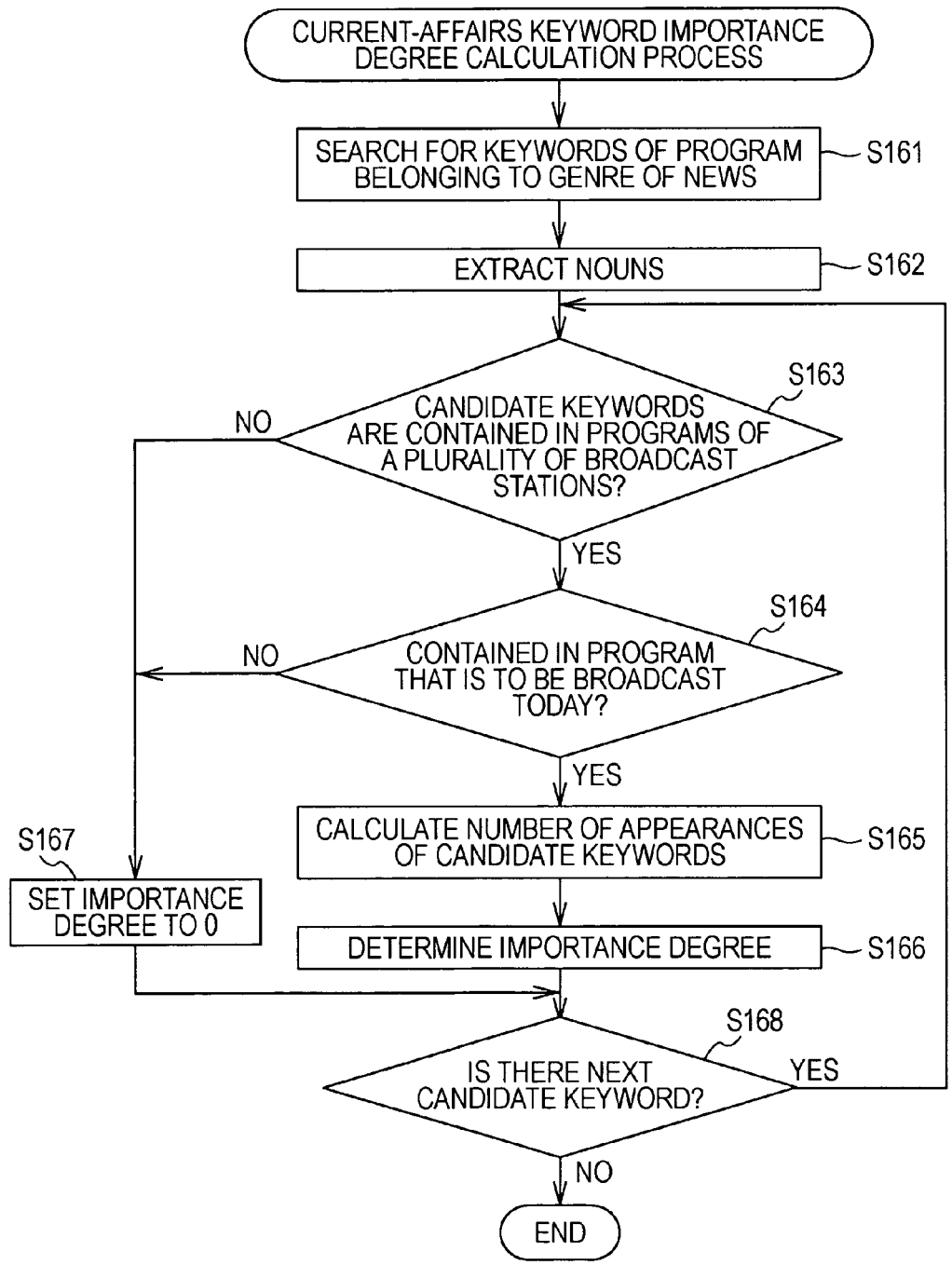
FIG. 13 is a flowchart illustrating an example of a current-affairs keyword importance degree calculation process.

Next, a description will be given, with reference to the flowchart of FIG. 13, of an example of a current-affairs keyword importance degree calculation process. This process is automatically performed, for example, in response to the completion of the keyword database creation process of FIG. 10.

In step S161, the keyword importance degree determination unit 212 of the importance degree determination unit 205 searches the keyword file for keywords of a program whose genre is "News".

In step S162, the keyword importance degree determination unit 212 extracts only keywords of a noun from among the keywords searched for in step S161, and sets the keywords as candidate keywords.

In step S163, the keyword importance degree determination unit 212 searches the keyword database for each of the candidate keywords, and determines whether or not the candidate keyword is a keyword extracted from each of the programs broadcast on a plurality of different broadcast stations. At this time, for example, it is determined whether or not the information on the plural broadcast stations of FIG. 5 is "○" or "×". In a case where the candidate keyword is a keyword (the information on the plural broadcast stations of FIG. 5 is "○") extracted from each of the programs broadcast on a plurality of different broadcast stations, the process proceeds to step S164.

In step S164, the keyword importance degree determination unit 212 determines whether or not the candidate keyword is a keyword extracted from only the program that is to be broadcast today. At this time, for example, the determination is made on the basis of the information on the appearance day of FIG. 5. When it is determined in step S164 that the candidate keyword is a keyword extracted from only the program that is to be broadcast today, the process proceeds to step S165.

In step S165, the keyword importance degree determination unit 212 calculates the number of appearances of the candidate keyword. At this time, for example, the information on the number of appearances on the appearance day of FIG. 5 is used.

In step S166, the keyword importance degree determination unit 212 determines the importance degree of the candidate keyword. For example, the value calculated in the process of step S165 or the value obtained by normalizing that value is set as the value of the importance degree.

The candidate keyword whose importance degree is determined (set) in step S166 is used as a current-affairs keyword. For example, the keyword "Gasoline" of the keyword database of FIG. 5 is used as a current-affairs keyword.

On the other hand, when it is determined in step S163 that the candidate keyword is not a keyword extracted from each of the programs broadcast from a plurality of different broadcast stations or when it is determined in step S164 that the candidate keyword is not a keyword extracted from only the program that is to be broadcast today, the process proceeds to step S167. In step S167, the importance degree of the candidate keyword is set to 0.

In step S167, the keyword importance degree determination unit 212 determines whether or not a next candidate keyword exists. When it is determined that the next candidate keyword exists, the process returns to step S163, and step S163 and subsequent steps are repeatedly performed.

When it is determined in step S168 that the next candidate keyword does not exist, the processing is completed.

The candidate keyword whose importance degree is set to 0 will not be handled as a current-affairs keyword in a recommendation screen display process (to be described later).

In the manner described above, the importance degree of the current-affairs keyword is calculated. As a result of the above, the importance degree of the keyword of an unexpected topic can be set to be high. That is, since an unexpected topic has a high probability of being broadcast in a program whose genre is "News", candidate keywords are identified from the programs of the genre. Furthermore, an unexpected topic that attracts a lot of attention is naturally broadcast from each broadcast station. Therefore, it is determined whether or not the candidate keyword is a keyword extracted from each of the programs broadcast on a plurality of different broadcast stations. Furthermore, since it is difficult to schedule an unexpected topic as broadcast content of a program in advance, it is further determined whether or not the candidate keyword is a keyword extracted from only the program that is to be broadcast today.

Figure 14:
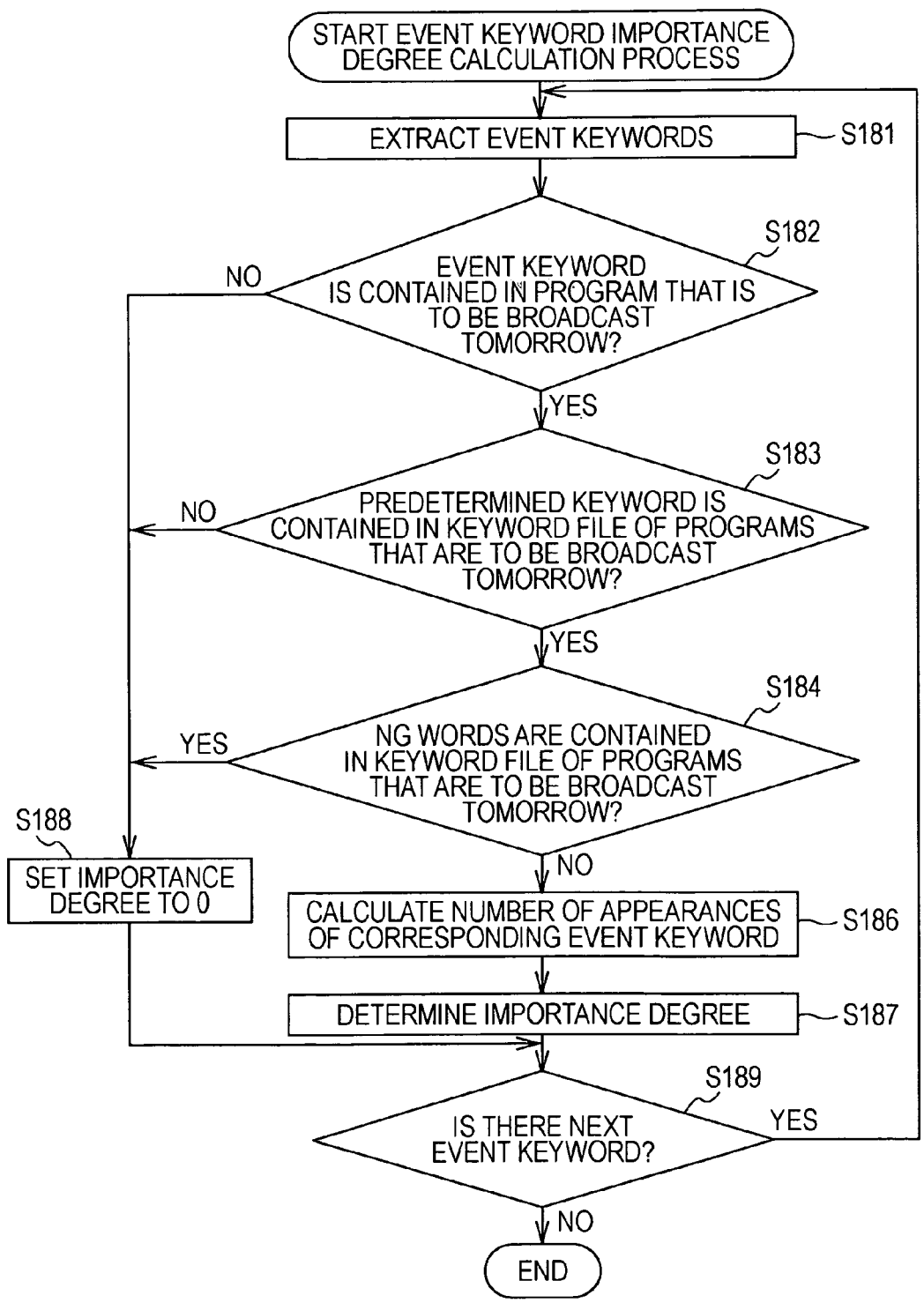
FIG. 14 is a flowchart illustrating an example of an event keyword importance degree calculation process.

Next, a description will be given, with reference to the flowchart of FIG. 14, of an example of an event keyword importance degree calculation process. This process is automatically performed in response to the completion of the keyword database creation process of FIG. 10.

In step S181, the keyword importance degree determination unit 212 extracts one event keyword.

In step S182, the keyword importance degree determination unit 212 searches the keyword database for the event keyword in order to determine whether or not the event keyword is contained in the programs that are to be broadcast tomorrow. At this time, for example, the determination is made on the basis of the information on the appearance day of FIG. 5.

When it is determined in step S182 that the event keyword is contained in the program that is to be broadcast tomorrow, the process proceeds to step S183.

In step S183, the keyword importance degree determination unit 212 identifies the program ID corresponding to the event keyword (that is, identifies the program that is to be broadcast tomorrow), and checks the keyword file corresponding to the identified program ID. Then, the keyword importance degree determination unit 212 determines whether or not a predetermined keyword is contained in the keyword file corresponding to the identified program ID. More specifically, for example, it is determined whether or not a keyword, such as "Relay" or "Live Relay" is contained in the keyword described in the attribute "Keywords" corresponding to the program ID of the keyword file described above with reference to FIG. 4.

Here, it has been described that the keyword file is checked. Alternatively, the EPG may be checked on the basis of the identified program ID. For example, it may be determined whether or not the above-described predetermined keyword is contained in the information, such as the program title of the identified program ID and the program description.

When it is determined in step S183 that the predetermined keyword has been contained, the process proceeds to step S184.

In step S184, the keyword importance degree determination unit 212 checks the keyword file of the program that is to be broadcast tomorrow, which is identified as a consequence of the process of step S182, so as to determine whether or not a preset NG word is contained. More specifically, for example, it is determined whether or not an NG word, such as "Summarized Version" or "Digest", is contained in the keywords described in the attribute "Keywords" of the keyword file described above with reference to reference FIG. 4.

Here, it has been described that the keyword file is checked. In addition, the EPG may be checked on the basis of the identified program ID.

When it is determined in step S184 that no NG word has been contained, the process proceeds to step S186.

In step S186, the keyword importance degree determination unit 212 calculates the number of appearances of the event keyword. At this time, for example, the value of the number of appearances of the event keyword described above with reference to FIG. 5 is used.

In step S187, the keyword importance degree determination unit 212 determines the importance degree of the event keyword. For example, the value calculated in the process of step S186 or the value obtained by normalizing that value is set as the value of the importance degree.

On the other hand, when it is determined in step S182 that the event keyword is not contained in the program that is to be broadcast tomorrow, when it is determined in step S183 that the predetermined keyword is not contained in the keyword file of the program that is to be broadcast tomorrow, or when it is determined in step S184 that an NG word is contained in the keyword file of the program that is to be broadcast tomorrow, the process proceeds to step S188.

In step S188, the keyword importance degree determination unit 212 sets the importance degree of the event keyword to 0.

In step S189, the keyword importance degree determination unit 212 determines whether or not a next event keyword exists. When it is determined in step S189 that the next event keyword exists, the process returns to step S181, and step S181 and subsequent steps are repeatedly performed.

When it is determined in step S189 that the next event keyword does not exist, the processing is completed.

The event keyword whose importance degree is set to 0 will not be handled as an event keyword in a recommendation screen display process (to be described later).

In the manner described above, the importance degree of the event keyword is calculated. As a result of the above, it is possible to attach a high importance degree to even an event keyword that differs from a current-affairs keyword and that attracts a lot of attention.

On the basis of the theme whose importance degree is set by the process described above with reference to FIGS. 13 and 14, the keyword, or the EPG data, display data for a recommended information screen on which the information on the programs belonging to the theme is presented or for a recommended information screen on which the information on the programs containing the keyword is presented, is generated. Next, a description will be given, with reference to the flowchart of FIG. 15, of an example of a recommendation screen display process. Here, a description will be given below of an example in which information on programs belonging to a theme having a high importance degree and information on programs belonging to a keyword having a high importance degree are displayed on one recommended information screen.

Figure 16:
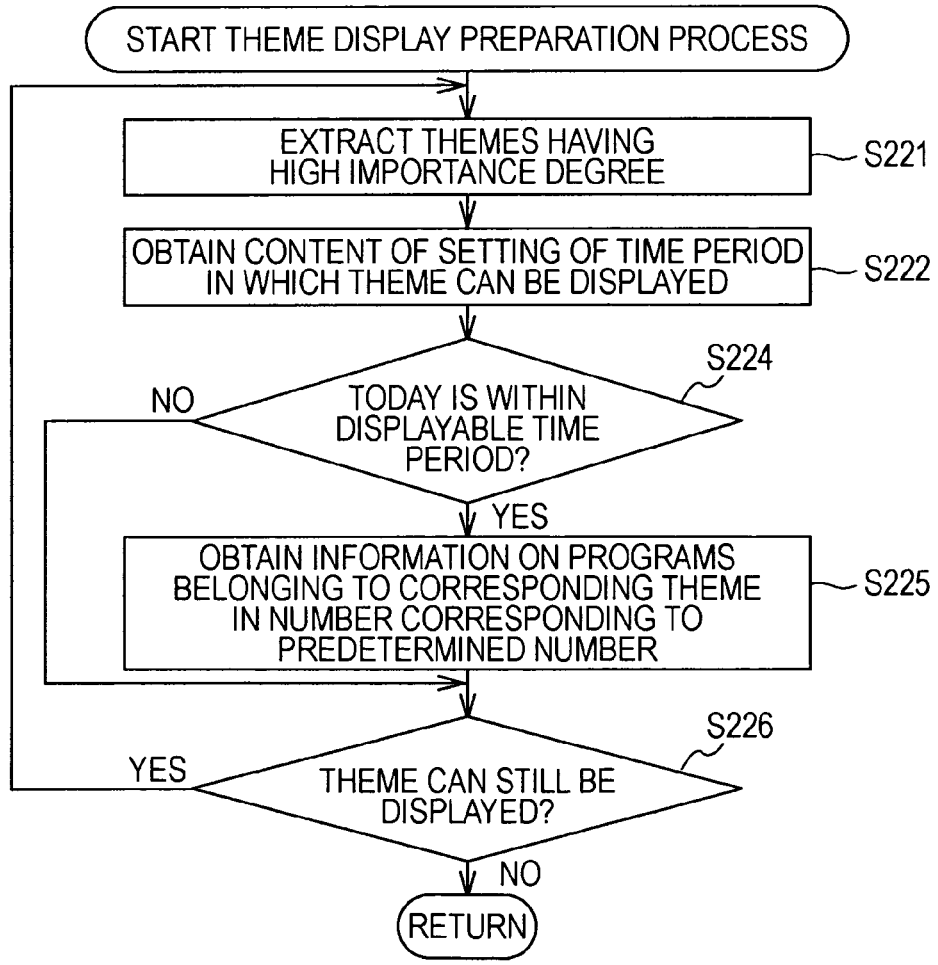
FIG. 16 is a flowchart illustrating an example of a theme display preparation process.

In step S201, the display data generator 206 performs a theme display preparation process (to be described later) with reference to FIG. 16. As a result, information on a theme that should be displayed on the recommendation screen and on programs belonging to the theme is obtained.

Figure 18:
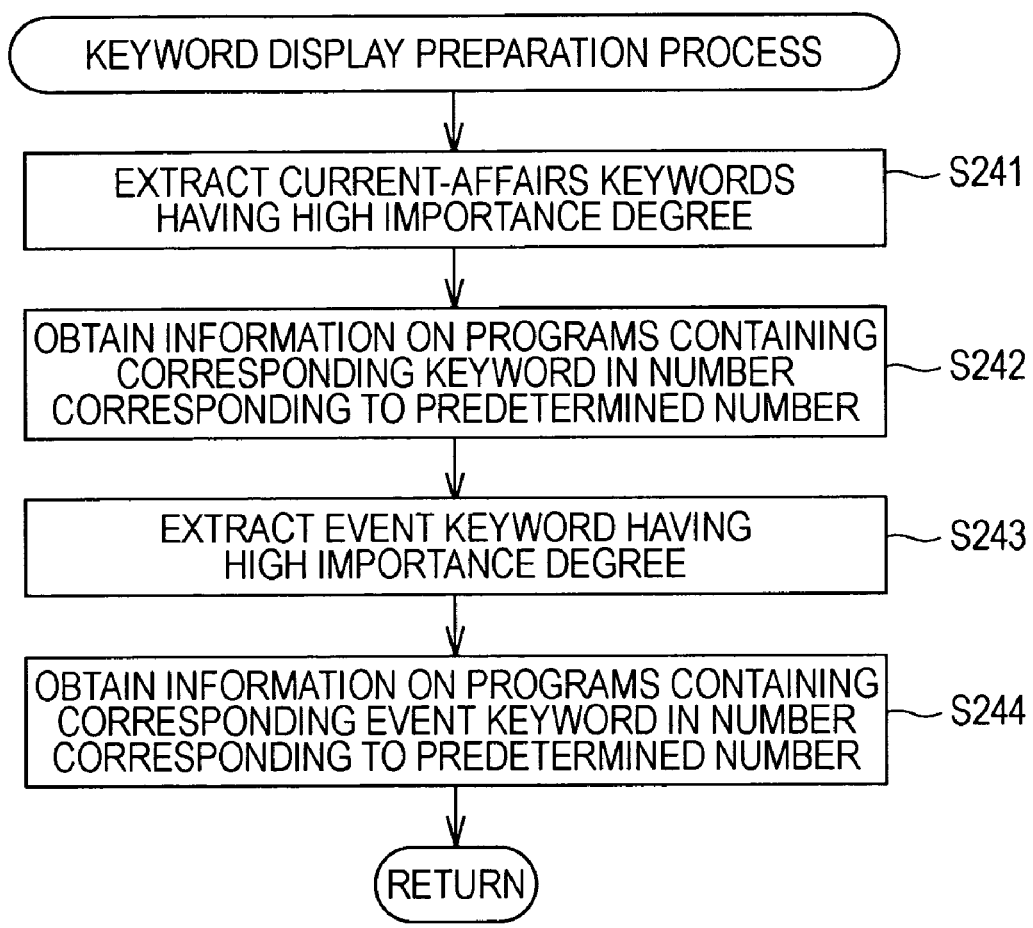
FIG. 18 is a flowchart illustrating an example of a keyword display preparation process.

In step S202, the display data generator 206 performs a keyword display preparation process (to be described later) with reference to FIG. 18. As a result, information on current-affairs keywords, event keywords, and programs containing those keywords, which should be displayed on the recommendation screen, is obtained.

In step S203, the display data generator 206 generates display data for the recommendation screen on the basis of the information obtained by the processes of steps S201 and S202.

In step S204, the display data generator 206 causes a recommendation screen to be displayed on, for example, the display unit of the television receiver 12 on the basis of the display data generated in the process of step S203.

Figure 15:
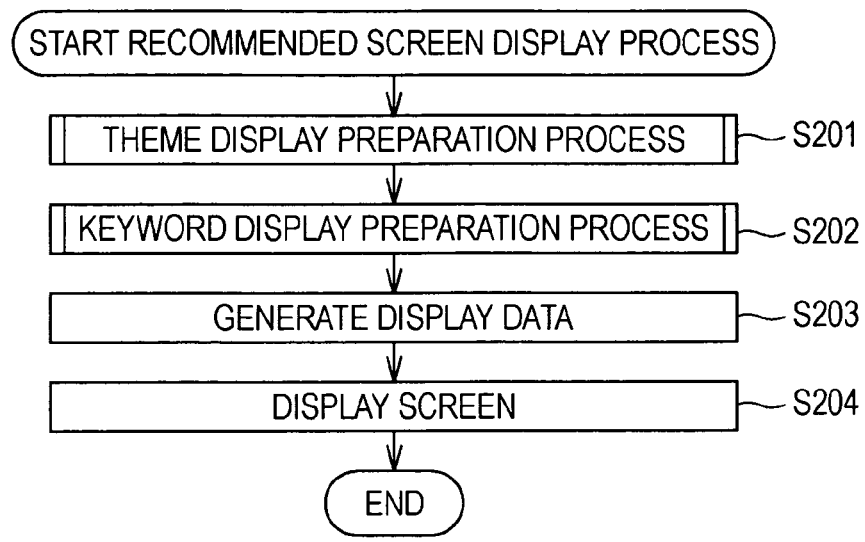
FIG. 15 is a flowchart illustrating an example of a recommendation screen display process.

Next, a description will be given, with reference to the flowchart of FIG. 16, the details of the theme display preparation process of step S201 of FIG. 15.

In step S221, the display data generator 206 extracts one theme having the highest importance degree.

In step S222, the display data generator 206 obtains the content on the setting of a time period in which the theme can be displayed.

Here, for the theme of a season, a theme of a theme name containing a word related to a season, such as "Golden Week Special Feature" or "Christmas Special Feature", of FIG. 6, is used. The theme names belonging to themes of seasons are assumed to be stored, for example, in the data management unit 220 in advance. Furthermore, it is assumed that the displayable time periods corresponding to themes of seasons are set and that the respective displayable time periods of the themes of the seasons are stored, for example, in the data management unit 220.

FIG. 17 shows examples of themes of seasons and displayable time periods thereof. In the figure, names of themes belonging to seasons, and displayable time periods thereof are displayed. The displayable time periods are displayed in such a manner as to be enclosed in parentheses in the figure.

For example, "Golden Week Special Feature" is a theme of a season, and the displayable time period thereof is April 25 to May 5 (4/25 to 5/5). "Christmas Special Feature" is also a theme of a season, and the displayable time period thereof is December 10 to December 25 (12/10 to 12/25).

In step S224, the display data generator 206 determines whether or not today is within the displayable time period of the theme. When it is determined in step S224 that today is within the displayable time period, the process proceeds to step S225.

In step S225, the display data generator 206 obtains information on programs belonging to the theme in a number corresponding to a predetermined number. At this time, for example, by using the theme data file of FIG. 8, the program ID of the program belonging the theme is identified, and on the basis of the identified program ID, information on the program title, the program description, and the like, which are contained in the EPG data, is obtained from the EPG data analysis unit 202. It is assumed that, for example, the number of programs that can be displayed as programs belonging to one theme on the recommendation screen is determined in advance, and the information on the programs in a number corresponding to the predetermined number of programs is obtained.

On the other hand, when it is determined in step S224 that today is not within the displayable time period, the process of step S225 is skipped. For example, a theme of a season, even if the theme has a high importance degree, is not displayed on the recommendation screen on days other than the displayable time period. The reason for this is that if a theme out of season is displayed on the recommendation screen, the user feels that the degree of freshness of the information on the recommendation screen is low.

In step S226, the display data generator 206 determines whether or not the theme can be displayed on the recommendation screen. In a case where, for example, the number of themes that can be displayed on the recommendation screen is set to, for example, two in advance, the display data generator 206 obtains information on programs with regard to each of the two themes. For example, in a case where information on programs of only one theme has been obtained, it is determined in step S226 that the theme can still be displayed, and the process returns to step S221.

In step S221, a theme having a next high importance degree is extracted, and the processing of steps S222 to S226 is performed.

When it is determined in step S226 that the theme is not possible to be displayed, the processing is completed.

In the manner described above, the theme display preparation process is performed.

Here, an example of a case in which displayable time periods have been set for themes of seasons has been described. Of course, it is also possible to set a displayable time period for other themes. Furthermore, the displayable time periods are not limited to those preset before the product is shipped, and may be set, for example, by the user by operating a remote controller 13.

Next, a description will be given, with reference to the flowchart of FIG. 18, of a detailed example of the keyword display preparation process of step S202 of FIG. 15.

In step S241, the display data generator 206 extracts one current-affairs keyword having the highest importance degree.

In step S242, information on programs containing the keyword is obtained in a number corresponding to a predetermined number. At this time, for example, the keyword database described above with reference to FIG. 5 allows the program ID of the program containing the keyword to be identified. Then, on the basis of the identified program ID, information on the program title, the program description, and the like contained in the EPG data is obtained from the EPG data analysis unit 202. It is assumed that, for example, the number of programs that can be displayed as programs corresponding to one current-affairs keyword on the recommendation screen is determined in advance and that information on programs in the number corresponding to the predetermined number of programs is obtained.

In step S243, the display data generator 206 extracts one event keyword having the highest importance degree.

In step S244, the display data generator 206 obtains information on programs that contain the event keyword and that are to be broadcast tomorrow in a number corresponding to the predetermined number. For example, the keyword database described above with reference to FIG. 5 allows the program IDs of the programs that contain the keyword and that are to be broadcast tomorrow to be identified. Then, on the basis of the identified program ID, information on the program title, the program description, and the like, which are contained in the EPG data, is obtained from the EPG data analysis unit 202. It is assumed that, for example, the number of programs that can be displayed on the recommendation screen as programs corresponding to one event keyword has been determined in advance and that information on the programs in a number corresponding to the predetermined number of programs is obtained.

For example, a large-scale sports event is often held day after day over several days. For this reason, if the same event keywords are displayed on the recommendation screen because the importance degree of the event keyword is high, the user loses interest in them. For this reason, the event keywords are obtained only in a case where the information on the program corresponding to the event keywords is a program on the first day or on the final day and the programs will be broadcast tomorrow.

In the manner described above, the keyword display preparation process is performed.

Figure 19:
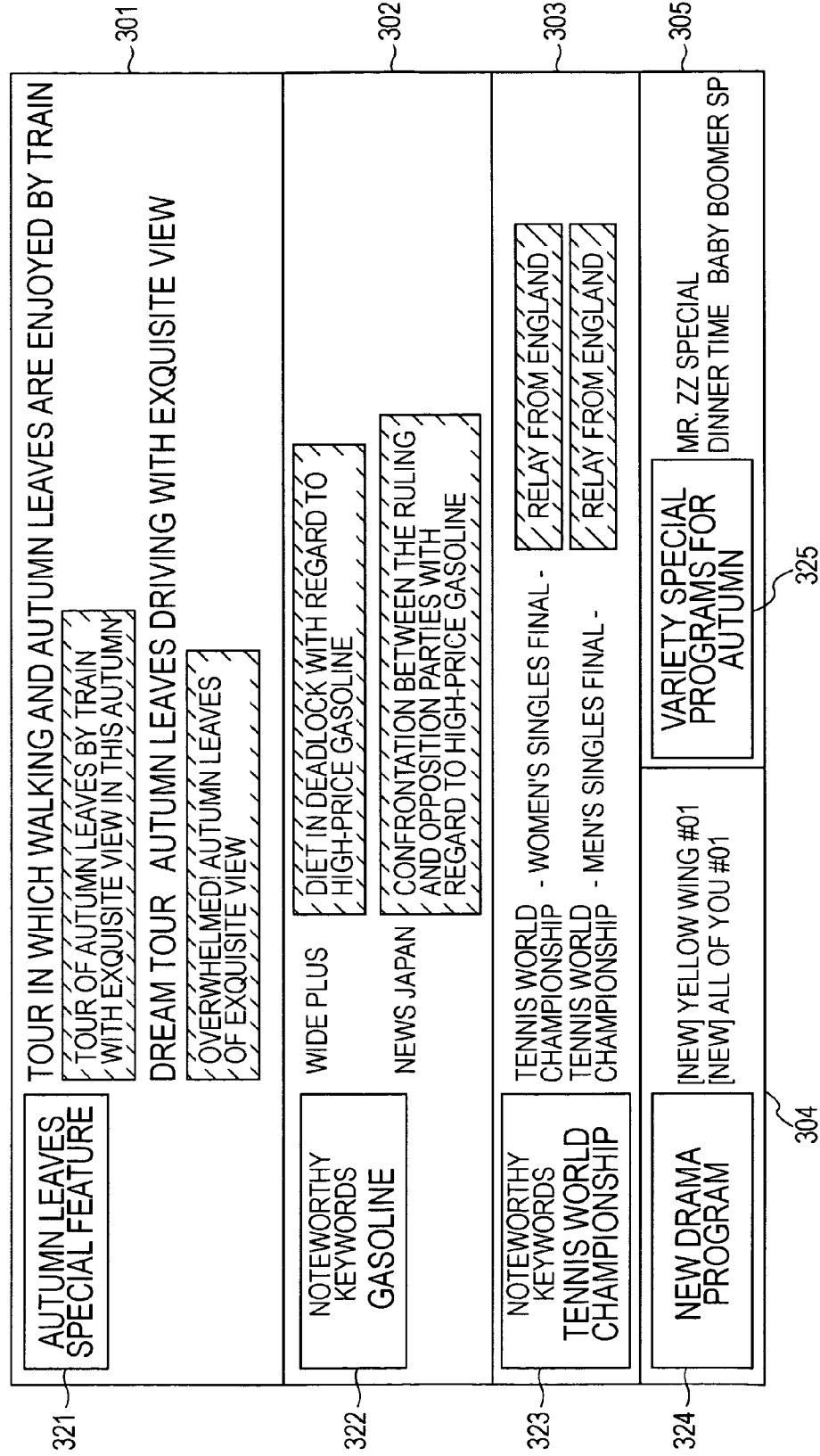
FIG. 19 shows an example of a recommendation screen.

FIG. 19 shows an example of a recommendation screen. In this example, the recommendation screen is formed of display frames 301 to 305.

The display frame 301 is used as a display frame for a theme. In this example, the text "Autumn Leaves Special Feature", which is the theme name, is displayed in an area 321. Furthermore, in the display frame 301, the information on programs belonging to this theme is displayed. In FIG. 19, for a text in portions that are not hatched, text displayed on the basis of the "Program Title" of the EPG is used, and for a text in portions that are hatched, text displayed on the basis of the information on the "Program Description" of the EPG is used.

In this example, in the display frame 301, information on a program whose program title is "Tour in which Walking and Autumn Leaves are Enjoyed by Train", and a program whose program title is "Dream Tour Autumn Leaves Driving with Exquisite View" is displayed.

The display frame 302 is used as a display frame for a current-affairs keyword. In this example, "Noteworthy Keywords" is displayed in an area 322, and the text of a keyword "Gasoline" is displayed. Furthermore, in the display frame 302, information on programs containing this current-affairs keyword is displayed. In this example, in the display frame 302, information on a program whose program title is "Wide Plus" and on a program whose program title is "New Japan" is displayed.

The display frame 303 is used as a display frame for an event keyword. In this example, "Noteworthy Keywords" is displayed in an area 323, and the text of keyword "Tennis World Championship" is displayed. Furthermore, in the display frame 303, information on programs containing these event keywords is displayed. In this example, in the display frame 302, information on a program whose program title is "Tennis World Championship—Women's Singles Final", and a program whose program title is "Tennis World Championship—Men's Singles Final" is displayed.

The display frame 304 is used as a display frame for a theme. In this example, the text of "New Drama Program", which is a theme name, is displayed in an area 324. Furthermore, in the display frame 304, information on programs belonging to this theme is displayed. In this example, in the display frame 304, information on a program whose program title is "[New] Yellow Wing #01" and a program whose program title is "[New] All of You #01" is displayed.

The display frame 305 is used as a display frame for a theme. The text of "Variety Special Programs for Autumn", which is a theme name, is displayed in an area 325. Furthermore, in the display frame 305, information on programs belonging to this theme is displayed. In this example, in the display frame 305, information on a program whose program title is "Mr. ZZ Special" and a program whose program title is "Dinner Time Baby Boomer SP" is displayed.

FIG. 19 shows only a display example, and display may be performed by another method. For example, only the theme may be displayed, only the current-affairs keyword may be displayed, or only the event keyword may be displayed in each display frame of the recommendation screen in response to the selection operation performed by the user via the remote controller 13.

The recommendation screen can also be displayed in such a manner as to be formed into hierarchies. The recommendation screen may also be structured in such a manner that, for example, when a portion of the area 321 of FIG. 19 is clicked by operating a GUI or the like, a screen shown in FIG. 20 is displayed.

FIG. 20 shows an example of the screen of the second hierarchy of the recommendation screen. FIG. 20 shows the screen of the second hierarchy corresponding to the display frame 301 of FIG. 20, and also shows information on programs belonging to the theme "Autumn Leaves Special Feature".

In FIG. 20, in a display frame 372, information on a program whose program title is "Tour in which Walking and Autumn Leaves are Enjoyed by Train" is displayed. In a display frame 371, information on broadcast dates and times and broadcast stations of programs displayed in the display frame 372 is displayed. In this example, it is displayed that the program is a program that is broadcast from a broadcast station "XX TV" from 19 o'clock (19:00) to 20 o'clock (20:00) on Wednesday October 21 (10/21). Furthermore, in the display frame 371, "To be Broadcast Soon" is displayed, so that it is possible to allow the user to recognize that the broadcast start time is approaching.

In a display frame 374, information on a program whose program title is "Dream Tour Autumn Leaves Driving with Exquisite View" is displayed. In a display frame 373, information regarding the broadcast date and time and the broadcast station of the program displayed on the display frame 374 is displayed. In this example, it is displayed that the program is a program that is to be broadcast on a broadcast station "YY TV" from 19 o'clock (19:00) to 20 o'clock (20:00) on Thursday October 22 (10/22).

In a similar manner, in a display frame 376 and a display frame 378, information on programs is displayed. In a display frame 375 and a display frame 377, information regarding the broadcast date and time and the broadcast station of each program is displayed. Both the programs, for which information on programs is displayed in the display frame 376 and the display frame 378, are programs belonging to the theme "Autumn Leaves Special Feature".

For example, it is also possible to set, when a portion of each of the display frame 371, the display frame 373, the display frame 375, or the display frame 377 is clicked, scheduled recording of a corresponding program.

When a portion of the other areas of FIG. 19 is clicked, information on the programs corresponding to the area is displayed in such a manner as to be formed into hierarchies as described above with reference to FIG. 20.

As described above, by forming the recommendation screen into hierarchies and displaying them, it is possible to increase the number of texts that can be displayed or increase the number of the characters of information regarding programs. In this case, information on only two programs is displayed in the display frame 301 of FIG. 19, but information on four programs is displayed in FIG. 20.

The above-described series of processes can be performed by hardware and also by software. When the series of processes is to be performed by software, a program constituting the software is installed from a network or a recording medium into a computer that is incorporated in specialized hardware or into, for example, a general-purpose computer 700 shown in FIG. 21, which is capable of performing various types of functions by installing various types of programs.

Figure 21:
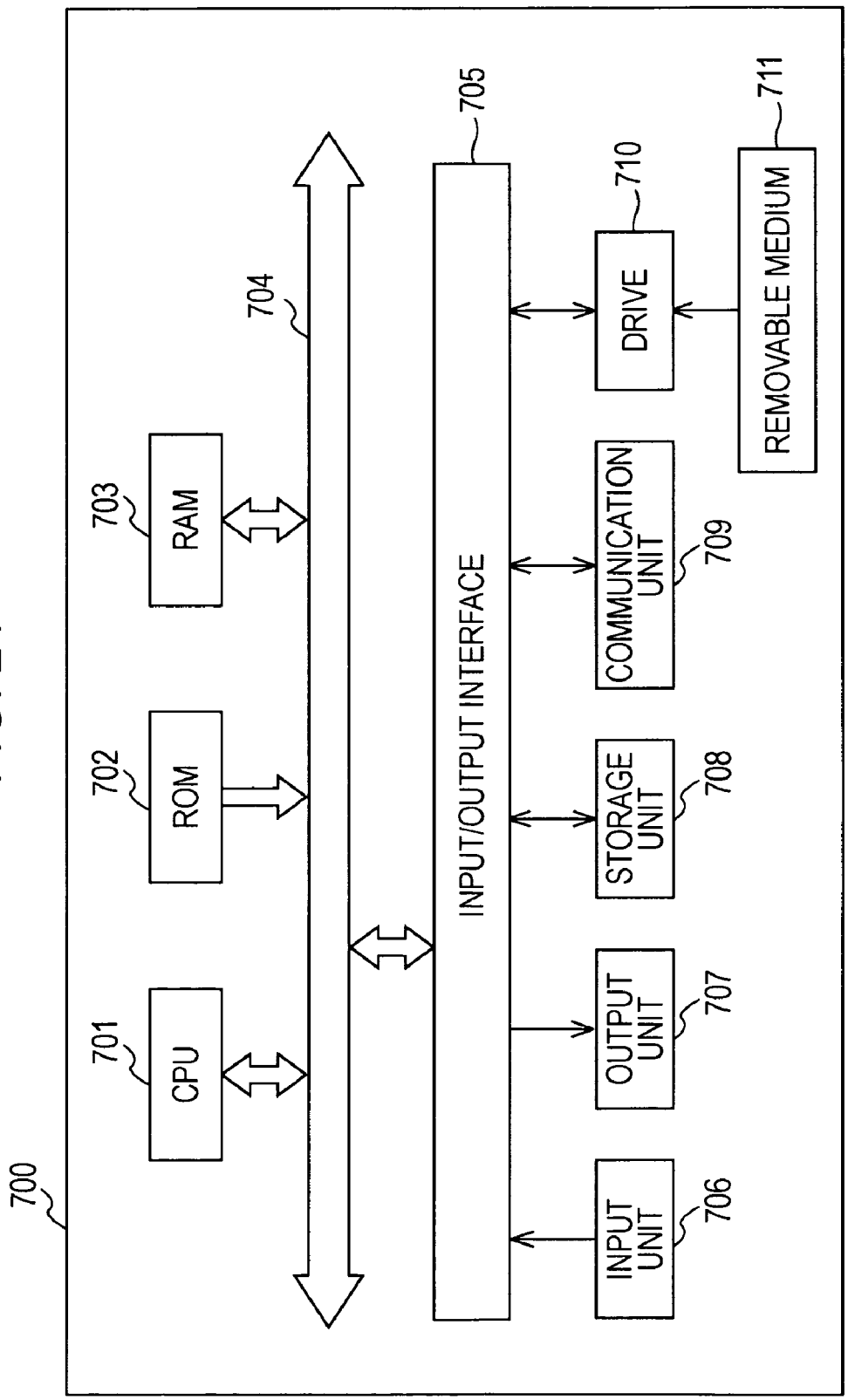
FIG. 21 is a block diagram showing an example of the configuration of a personal computer.

In FIG. 21, a CPU (Central Processing Unit) 701 performs various kinds of processing in accordance with a program stored in a ROM (Read Only Memory) 702 or in accordance with a program loaded from a storage unit 708 to a RAM (Random Access Memory) 703. In the RAM 703, furthermore, data necessary for the CPU 701 to perform various kinds of processing is stored as appropriate.

The CPU 701, the ROM 702, and the RAM 703 are interconnected with one another via a bus 704. Furthermore, also, an input/output interface 705 is connected to this bus 704.

An input unit 706, an output unit 707, a storage unit 708, and a communication unit 709 are connected to the input/output interface 705. The input unit 706 includes a keyboard, a mouse, and the like. The output unit 707 includes a display unit formed of a CRT (Cathode Ray Tube), an LCD (Liquid Crystal display) panel, or the like, and a speaker. The storage unit 708 includes a hard disk and the like. The communication unit 709 includes a network interface card, such as a modem, a LAN card, and the like. The communication unit 709 performs a communication process via a network including the Internet.

Furthermore, a drive 710 is connected to the input/output interface 705 as necessary. A removable medium 711, such as a magnetic disk, an optical disc, a magneto-optical disk, or a semiconductor memory, is loaded into the drive 710 as appropriate. A computer program read therefrom is installed into the storage unit 708 as necessary.

When the series of processes is to be performed by software, a program constituting the software is installed via a network, such as the Internet, or from a recording medium formed of the removable medium 711.

The recording medium may be formed of the removable medium 711 which is composed of a magnetic disk (including a floppy disk (registered trademark)), an optical disc (including a CD-ROM (Compact Disc-Read Only Memory) or a DVD (Digital Versatile Disc)), a magneto-optical disc (including an MD (Mini-disk) (registered trademark)), or a semiconductor memory, in which a program is recorded, the recording medium being distributed to provide the program to the user separately from the main unit of the apparatus shown in FIG. 21. In addition, the recording medium may be formed of the ROM 702, a hard disk contained in the storage unit 708, and the like, in which a program that is provided to the user is recorded, in a state of being incorporated in advance into the main unit of the apparatus is recorded.

In this specification, steps for performing the above-described series of processes may be processes that are performed in a time-series manner according to the written order, but also processes that are performed in parallel or individually although they may not be performed in a time-series manner.

It should be understood by those skilled in the art that various modifications, combinations, sub-combinations and alterations may occur depending on design requirements and other factors insofar as they are within the scope of the appended claims or the equivalents hereof.

What is claimed is:

1. An information processing apparatus comprising:
    obtaining means for obtaining program information on programs that are to be broadcast in a predetermined time period;
    extraction means for extracting keywords indicating the content of the programs from text data contained in the program information obtained for each of the programs;
    storage means for prestoring theme definition information containing information on the keywords, each of the keywords being associated with a corresponding one of a plurality of themes;
    theme identifying means for identifying which theme a predetermined program belongs to on the basis of the keyword extracted for each program and on the basis of the theme definition information; and
    rate-of-change computation means for computing, for each of the identified themes, a rate of change of the number of times a program belonging to the identified theme is broadcast on a first day in the predetermined time period to the number of times the program is broadcast on a second day,
    wherein an importance degree indicating an importance characteristic of the theme for a user is determined on the basis of the computed rate of change; and
    determining means for determining whether to present to a user, as recommendation information, information on the program belonging to a theme from among the plurality of themes determined to have a high importance degree, based on whether a day on which the recommendation information is to be presented is within a preset time period during which the determined theme can be displayed.

2. The information processing apparatus according to claim 1,
    wherein the obtaining means obtains information on programs that are to be broadcast in eight days from and including today,
    wherein the rate-of-change computation means computes a rate of change of the number of times of a program is broadcast today to the number of times a program is broadcast on the eighth day.

3. The information processing apparatus according to claim 1, further comprising:
    presentation means for selecting a predetermined number of themes having a high importance degree from among the plurality of themes and for presenting information on the programs belonging to the selected themes as recommendation information to a user.

4. The information processing apparatus according to claim 3, wherein the recommendation information is displayed as a screen that is formed into hierarchies on a display unit connected to the information processing apparatus.

5. The information processing apparatus according to claim 3, wherein when a day on which the recommendation information is presented to the user is within a preset time period during which the plurality of themes can be displayed in advance, the presentation means presents information on the programs belonging to the selected themes as recommendation information.

6. The information processing apparatus according to claim 5, wherein a time period during which themes containing words related to seasons from among the plurality of themes can be displayed is set.

7. An information processing method comprising the steps of:
    obtaining program information on programs that are to be broadcast in a predetermined time period;
    extracting keywords indicating the content of the programs from text data contained in the program information obtained for a corresponding one of the programs;
    identifying which theme a predetermined program belongs to on the basis of the keyword extracted for each program and on the basis of prestored theme definition information containing information on keywords associated with a corresponding one of a plurality of themes;
    computing, for each of the identified themes, a rate of change of the number of times a program belonging to the identified theme is broadcast on a first day in the predetermined time period to the number of times the program is broadcast on a second day, and determining an importance degree indicating an importance characteristic of the theme for a user on the basis of the computed rate of change; and
    determining whether to present to a user, as recommendation information, information on the program belonging to a theme from among the plurality of themes determined to have a high importance degree, based on whether a day on which the recommendation information is to be presented is within a preset time period during which the determined theme can be displayed.

8. A non-transitory computer-readable recording medium having recorded thereon a program for causing a computer to function as an information processing apparatus, the program including:
    obtaining program information on programs that are to be broadcast in a predetermined time period;
    extracting keywords indicating the content of the programs from text data contained in the program information obtained for each of the programs;
    prestoring theme definition information containing information on the keywords, each of the keywords being associated with a corresponding one of a plurality of themes;

identifying which theme a predetermined program belongs to on the basis of the keyword extracted for each program and on the basis of the theme definition information;

computing, for each of the identified themes, a rate of change of the number of times a program belonging to the identified theme is broadcast on a first day in the predetermined time period to the number of times the program is broadcast on a second day, wherein an importance degree indicating an importance characteristic of the theme for a user is determined on the basis of the computed rate of change; and determining whether to present to a user, as recommendation information, information on the program belonging to a theme from among the plurality of themes determined to have a high importance degree, based on whether a day on which the recommendation information is to be presented is within a preset time period during which the determined theme can be displayed.

9. An information processing apparatus comprising:

an obtaining unit configured to obtain program information on programs that are to be broadcast in a predetermined time period;

an extraction unit configured to extract keywords indicating the content of the programs from text data contained in the program information obtained for each of the programs;

a storage unit configured to prestore theme definition information containing information on the keywords, each of the keywords being associated with a corresponding one of a plurality of themes;

a theme identifying unit configured to identify which theme a predetermined program belongs to on the basis of the keyword extracted for each program and on the basis of the theme definition information;

a rate-of-change computation unit configured to compute, for each of the identified themes, a rate of change of the number of times a program belonging to the identified theme is broadcast on a first day in the predetermined time period to the number of times the program is broadcast on a second day, wherein an importance degree indicating an importance characteristic of the theme for a user is determined on the basis of the computed rate of change; and determining unit configured to determine whether to present to a user, as recommendation information, information on the program belonging to a theme from among the plurality of themes determined to have a high importance degree, based on whether a day on which the recommendation information is to be presented is within a preset time period during which the determined theme can be displayed.

* * * * *